US012795517B2

(12) United States Patent
Yan et al.

(10) Patent No.: US 12,795,517 B2
(45) Date of Patent: Nov. 10, 2026

(54) INFORMATION PROCESSING METHODS AND INFORMATION PROCESSING DEVICES

(71) Applicant: DATANG MOBILE COMMUNICATIONS EQUIPMENT CO., LTD., Beijing (CN)

(72) Inventors: Xue Yan, Beijing (CN); Nan Yan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 326 days.

(21) Appl. No.: 18/689,394

(22) PCT Filed: Sep. 2, 2022

(86) PCT No.: PCT/CN2022/116760
§ 371 (c)(1),
(2) Date: Mar. 5, 2024

(87) PCT Pub. No.: WO2023/036059
PCT Pub. Date: Mar. 16, 2023

(65) Prior Publication Data

US 2024/0373328 A1 Nov. 7, 2024

(30) Foreign Application Priority Data

Sep. 7, 2021 (CN) ......................... 202111042736.1

(51) Int. Cl.
*H04W 72/00* (2023.01)
*H04W 48/14* (2009.01)
(Continued)

(52) U.S. Cl.
CPC ........... *H04W 48/14* (2013.01); *H04W 76/27* (2018.02); *H04W 88/04* (2013.01); *H04W 92/18* (2013.01)

(58) Field of Classification Search
CPC ..... H04W 48/14; H04W 76/27; H04W 88/04; H04W 92/18
See application file for complete search history.

(56) References Cited

U.S. PATENT DOCUMENTS 11,653,286 B2 * 5/2023 Liao ...................... H04W 76/14 370/315
2018/0092027 A1 3/2018 Sheng
(Continued)

FOREIGN PATENT DOCUMENTS

CN 110073685 A 7/2019
CN 110798844 A 2/2020
(Continued)

OTHER PUBLICATIONS

Connection establishment for L2 UE-to-Network Relay, 3GPP TSG-RAN WG2 Meeting #113bis electronic, R2-2102779, Online, Apr. 12-20, 2021, Agenda Item: 8.7.4.1 , Source: MediaTek Inc (Year: 2021).*
(Continued)

*Primary Examiner* — Lan-Huong Truong
(74) *Attorney, Agent, or Firm* — Ladas & Parry, LLP

(57) ABSTRACT

The present application provides information processing methods and information processing devices, and it relates to the field of communications technology. The information processing method includes: obtaining, by a relay UE, association information related to an on-demand SI request, the association information including first association information that is generated when the on-demand SI request is
(Continued)

triggered by the relay UE; and transmitting, by the relay UE, the association information to a network device.

17 Claims, 3 Drawing Sheets

(51) Int. Cl.

| | |
|---|---|
| ***H04W 76/27*** | (2018.01) |
| *H04W 88/04* | (2009.01) |
| *H04W 92/18* | (2009.01) |

(56) References Cited

U.S. PATENT DOCUMENTS

| | | | | |
|---|---|---|---|---|
| 2021/0120476 | A1 | 4/2021 | Lee et al. | |
| 2021/0219385 | A1* | 7/2021 | Paladugu | H04W 8/005 |
| 2021/0329472 | A1 | 10/2021 | Xie et al. | |
| 2022/0095411 | A1* | 3/2022 | Lin | H04W 76/27 |
| 2022/0264280 | A1* | 8/2022 | Chang | H04W 48/14 |
| 2024/0015637 | A1* | 1/2024 | Cheng | H04W 12/0471 |

FOREIGN PATENT DOCUMENTS

| | | | |
|---|---|---|---|
| WO | 2021134162 | A1 | 7/2021 |
| WO | 2021139675 | A1 | 7/2021 |

OTHER PUBLICATIONS

International Search Report for International Patent Application No. PCT/CN2022/116760 issued by the International Patent Office on Nov. 30, 2022, and its English translation provided by WIPO.

Written Opinion for International Patent Application No. PCT/CN2022/1176760 issued by the International Patent Office on Nov. 30, 2022, and its English translation provided by WIPO.

International Preliminary Report on Patentability for International Patent Application No. PCT/CN2022/116760 issued by the International Patent Office on Mar. 5, 2024 and its English translation provided by WIPO.

"On-demand SI Delivery for Remote UE," 3GPP TSG-RAN WG2 Meeting #112-e, R2-2008922, Electronic, Nov. 2-13, 2020, Source: CATT, Agenda Item: 8.7.3.1.

"Connection establishment for L2 UE-to-Network Relay," 3GPP TSG-RAN WG2 Meeting #113bis electronic, R2-2102779, Online, Apr. 12-20, 2021, Agenda Item: 8.7.4.1 , Source: MediaTek Inc.

* cited by examiner

INFORMATION PROCESSING METHODS AND INFORMATION PROCESSING DEVICES

CROSS-REFERENCE TO RELATED APPLICATIONS

This application is a U.S. national phase application of a PCT Application No. PCT/CN2022/116760 filed on Sep. 2, 2022, which claims priority to the Chinese Patent Application No. 202111042736.1 filed on Sep. 7, 2021, the disclosures of which are incorporated herein by reference in their entireties.

TECHNICAL FIELD

The present application relates to the field of communications technology, in particular to information processing methods and information processing devices.

BACKGROUND

In a current New Radio (NR) system, apart from a System Information Block1 (SIB1), all System Information Blocks (SIBs) are probably set as in an on-demand broadcasting mode. A mechanism of collecting and reporting an on-demand System Information (SI) request has been discussed in Minimal Drive Test (MDT). And relevant information, e.g., an SIB type for an on-demand request for a User Equipment (UE) and the quantity of requests for a certain SIB, is collected and reported, so as to help a network to determine whether a certain SIB needs to be broadcast or a resource configuration needs to be optimized in a more accurate manner.

Currently, a remote UE requests for SI through a relay UE. When the remote UE is in an idle state or an inactive state, the remote UE requests for the SI from the relay UE through a PC5-Radio Resource Control (RRC) message, and the relay UE triggers a conventional SI obtaining procedure to obtain the SI and forwards it to the remote UE. When the remote UE is in a connected state, the remote UE obtains the SI through a dedicated SIB request.

However, there is an urgent need to provide a scheme for collecting the on-demand SI request in a scenario of the remote UE and the relay UE.

SUMMARY

An object of the present application is to provide information processing methods and information processing devices, so as to solve the problem in a relay scenario where it is impossible for a network device to accurately obtain association information related to the on-demand SI request.

In one aspect, the present application provides in some embodiments an information processing method performed by a relay UE, including: obtaining, by the relay UE, association information related to an on-demand SI request, the association information including first association information that is generated when the on-demand SI request is triggered by the relay UE; and transmitting, by the relay UE, the association information to a network device.

In a possible embodiment of the present application, the first association information includes one or more of: first sub-association information that is generated when the on-demand SI request is voluntarily triggered by the relay UE and on-demand SI is requested successfully; second sub-association information that is generated when the on-demand SI request is voluntarily triggered by the relay UE and the on-demand SI is requested unsuccessfully; third sub-association information that is generated when the relay UE plans to request for, but has not yet requested for, the on-demand SI; fourth sub-association information that is generated when the on-demand SI request is passively triggered by the relay UE and the on-demand SI is requested successfully; fifth sub-association information that is generated when the on-demand SI request is passively triggered by the relay UE and the on-demand SI is requested unsuccessfully; or sixth sub-association information that is generated when the on-demand SI request is passively triggered by the relay UE and the on-demand SI has not yet been requested. The on-demand SI request triggered by the relay UE passively includes an on-demand SI request triggered passively upon the receipt of an SI request message from a remote UE.

In a possible embodiment of the present application, the association information includes one or more of: a type of requested SI; the quantity of requests; a type of a UE requesting for the SI, the type of the UE including a relay UE and/or a remote UE; a quantity of UEs requesting for the SI; or Identities (IDs) of UEs requesting for the SI.

In a possible embodiment of the present application, subsequent to obtaining the association information related to the on-demand SI request, the information processing method further includes: transmitting a first notification message to the network device when the relay UE is in a connected state, where the first notification message is used to notify the network device that the association information is stored in the relay UE.

In a possible embodiment of the present application, the transmitting, by the relay UE, the association information to the network device includes: receiving a first association information obtaining request from the network device, where the first association information obtaining request being used to request for the association information stored in the relay UE; and transmitting the association information satisfying the first association information obtaining request to the network device in accordance with the first association information obtaining request.

In a possible embodiment of the present application, the association information further includes second association information that is generated when the on-demand SI request is voluntarily triggered by a remote UE, and the obtaining, by the relay UE, the association information related to the on-demand SI request includes: receiving the second association information from the remote UE. The second association information includes one or more of: association information that is generated when the on-demand SI request is triggered by the remote UE in a connected state on its own initiative and the on-demand SI request is requested successfully; association information that is generated when the on-demand SI request is triggered by the remote UE in the connected state on its own initiative and the on-demand SI request is requested unsuccessfully; association information that is generated when the remote UE in the connected state plans to request for, but has not yet requested for, the on-demand SI; association information that is generated when the remote UE in a non-connected state transmits a request to the relay UE unsuccessfully; association information that is generated when the remote UE in the non-connected state transmits a request to the relay UE successfully; or association information that is generated when the remote UE in the non-connected state plans to request for, but has not yet requested for, the on-demand SI.

In a possible embodiment of the present application, the obtaining, by the relay UE, the association information related to the on-demand SI request includes: obtaining first configuration information from the network device, where the first configuration information being used to indicate whether the relay UE is to obtain the association information related to the on-demand SI request triggered by a remote UE; in the case that the first configuration information indicates that the relay UE is to obtain the association information related to the on-demand SI request triggered by the remote UE, receiving second association information from the remote UE, the second association information being association information that is generated when the on-demand SI request is triggered by the remote UE on its own initiative; and/or determining the on-demand SI request triggered passively upon the receipt of an SI request message from the remote UE, and obtaining one or more of fourth sub-association information, fifth sub-association information or sixth sub-association information that is generated when the on-demand SI request is triggered passively.

In a possible embodiment of the present application, the obtaining, by the relay UE, the association information related to the on-demand SI request includes obtaining, in accordance with a designated UE state in first configuration information from the network device, the association information related to the on-demand SI request and generated in the designated UE state, and the designated UE state includes one or more of a connected state, an idle state or an inactive state.

In another aspect, the present application provides in some embodiments an information processing method performed by a remote UE, including: obtaining, by the remote UE, second association information that is generated when an on-demand SI request is triggered by the remote UE on its own initiative; and transmitting, by the remote UE, the second association information to a network device or a relay UE.

In a possible embodiment of the present application, the second association information includes one or more of: association information that is generated when the on-demand SI request is triggered by the remote UE in a connected state on its own initiative and on-demand SI is requested successfully; association information that is generated when the on-demand SI request is triggered by the remote UE in the connected state on its own initiative and the on-demand SI is requested unsuccessfully; association information that is generated when the remote UE in the connected state plans to request for, but has not yet requested for, the on-demand SI; association information that is generated when the remote UE in a non-connected state transmits a request to the relay UE unsuccessfully; association information that is generated when the remote UE in the non-connected state transmits a request to the relay UE successfully; or association information that is generated when the remote UE in the non-connected state plans to request for, but has not yet requested for, the on-demand SI.

In a possible embodiment of the present application, subsequent to obtaining the second association information that is generated when the on-demand SI request is triggered by the remote UE on its own initiative, the information processing method further includes, in the case that the remote UE is in a connected state, transmitting a second notification message to the network device, and the second notification message is used to notify the network device that the second association information is stored in the remote UE.

In a possible embodiment of the present application, the transmitting, by the remote UE, the second association information to the network device includes: receiving a second association information obtaining request from the network device, the second association information obtaining request being used to request association information stored in the remote UE; and transmitting the association information satisfying the second association information obtaining request to the network device in accordance with the second association information obtaining request.

In a possible embodiment of the present application, the obtaining, by the remote UE, the second association information that is generated when the on-demand SI request is triggered by the remote UE on its own initiative includes receiving second configuration information from the network device, and the second configuration information is used to indicate whether the remote UE obtains the second association information that is generated when the on-demand SI request is triggered by the remote UE on its own initiative.

In a possible embodiment of the present application, the obtaining, by the remote UE, the association information related to the on-demand SI request includes obtaining, in accordance with a designated UE state in the second configuration information from the network device, the association information related to the on-demand SI request and generated in the designated UE state, and the designated UE state includes one or more of a connected state, an idle state or an inactive state.

In yet another aspect, the present application provides in some embodiments an information processing method performed by a network device, including receiving, by the network device, association information related to an on-demand SI request from a relay UE, and/or second association information from a remote UE. The association information includes first association information that is generated when the on-demand SI request is triggered by the relay UE, and the second association information is generated when the on-demand SI request is triggered by the remote UE on its own initiative.

In a possible embodiment of the present application, when the network device receives the association information, prior to receiving the association information related to the on-demand SI request from the relay UE, the information processing method further includes receiving a first notification message from the relay UE in a connected state, and the first notification message is used to notify the network device that the association information is stored in the relay UE.

In a possible embodiment of the present application, when the network device receives the second association information, prior to receiving the second association information from the remote UE, the information processing method further includes receiving a second notification message from the remote UE in the connected state, and the second notification message is used to notify the network device that the second association information is stored in the remote UE.

In a possible embodiment of the present application, when the network device receives the association information, prior to receiving the association information related to the on-demand SI request from the relay UE, the information processing method further includes transmitting a first association information obtaining request to the relay UE, and the first association information obtaining request is used to request for the association information stored in the relay UE.

In a possible embodiment of the present application, when the network device receives the second association information, prior to receiving the second association information from the remote UE, the information processing method further includes transmitting a second association information obtaining request to the remote UE, and the second association information obtaining request is used to request for the association information stored in the remote UE.

In a possible embodiment of the present application, when the network device receives the association information, prior to receiving the association information related to the on-demand SI request from the relay UE, the information processing method further includes transmitting first configuration information to the relay UE, and the first configuration information is used to indicate whether the relay UE obtains the association information that is generated when the on-demand SI request is triggered by the remote UE.

In a possible embodiment of the present application, when the network device receives the second association information, prior to receiving the second association information from the remote UE, the information processing method further includes transmitting second configuration information to the remote UE, and the second configuration information is used to indicate whether the remote UE obtains the second association information that is generated when the on-demand SI request is triggered by the remote UE on its own initiative.

In still yet another aspect, the present application provides in some embodiments an information processing device, including a memory, a transceiver and a processor. The memory is configured to store therein a program instruction. The transceiver is configured to receive and transmit data under the control of the processor. The processor is configured to read the program instruction in the memory so as to obtain association information related to an on-demand SI request, and the association information includes first association information that is generated when the on-demand SI request is triggered by a relay UE. The transceiver is configured to transmit the association information to a network device.

In a possible embodiment of the present application, the first association information includes one or more of: first sub-association information that is generated when the on-demand SI request is voluntarily triggered by the relay UE and on-demand SI is requested successfully; second sub-association information that is generated when the on-demand SI request is voluntarily triggered by the relay UE and the on-demand SI is requested unsuccessfully; third sub-association information that is generated when the relay UE plans to request for, but has not yet requested for, the on-demand SI; fourth sub-association information that is generated when the on-demand SI request is passively triggered by the relay UE and the on-demand SI is requested successfully; fifth sub-association information that is generated when the on-demand SI request is passively triggered by the relay UE and the on-demand SI is requested unsuccessfully; or sixth sub-association information that is generated when the on-demand SI request is passively triggered by the relay UE and the on-demand SI has not yet been requested. The on-demand SI request triggered by the relay UE passively includes an on-demand SI request triggered passively upon the receipt of an SI request message from a remote UE.

In a possible embodiment of the present application, the association information includes one or more of: a type of requested SI; the quantity of requests; a type of a UE requesting for the SI, the type of the UE including a relay UE and/or a remote UE; a quantity of UEs requesting for the SI; or IDs of UEs requesting for the SI.

In a possible embodiment of the present application, after the processor has obtained the association information related to the on-demand SI request, the transceiver is further configured to, in the case that the relay UE is in a connected state, transmit a first notification message to the network device, and the first notification message is used to notify the network device that the association information is stored in the relay UE.

In a possible embodiment of the present application, the transceiver is specifically configured to: receive a first association information obtaining request from the network device, the first association information obtaining request being used to request for the association information stored in the relay UE; and transmit the association information satisfying the first association information obtaining request to the network device in accordance with the first association information obtaining request.

In a possible embodiment of the present application, the association information further includes second association information that is generated when the on-demand SI request is voluntarily triggered by a remote UE, and when obtaining the association information related to the on-demand SI request, the processor is further configured to receive the second association information from the remote UE. The second association information includes one or more of: association information that is generated when the on-demand SI request is triggered by the remote UE in a connected state on its own initiative and the on-demand SI request is requested successfully; association information that is generated when the on-demand SI request is triggered by the remote UE in the connected state on its own initiative and the on-demand SI request is requested unsuccessfully; association information that is generated when the remote UE in the connected state plans to request for, but has not yet requested for, the on-demand SI; association information that is generated when the remote UE in a non-connected state transmits a request to the relay UE unsuccessfully; association information that is generated when the remote UE in the non-connected state transmits a request to the relay UE successfully; or association information that is generated when the remote UE in the non-connected state plans to request for, but has not yet requested for, the on-demand SI.

In a possible embodiment of the present application, when obtaining the association information related to the on-demand SI request, the processor is specifically configured to: obtain first configuration information from the network device, the first configuration information being used to indicate whether the relay UE is to obtain the association information related to the on-demand SI request triggered by a remote UE; in the case that the first configuration information indicates that the relay UE is to obtain the association information related to the on-demand SI request triggered by the remote UE, receive second association information from the remote UE, the second association information being association information that is generated when the on-demand SI request is triggered by the remote UE on its own initiative; and/or determine the on-demand SI request triggered passively upon the receipt of an SI request message from the remote UE, and obtain one or more of fourth sub-association information, fifth sub-association information or sixth sub-association information that is generated when the on-demand SI request is triggered passively.

In a possible embodiment of the present application, the processor is specifically configured to obtain, in accordance with a designated UE state in first configuration information from the network device, the association information related to the on-demand SI request and generated in the designated UE state, and the designated UE state includes one or more of a connected state, an idle state or an inactive state.

In still yet another aspect, the present application provides in some embodiments an information processing device, including: a first obtaining module configured to obtain association information related to an on-demand SI request, the association information including first association information that is generated when the on-demand SI request is triggered by a relay UE; and a first transmission module configured to transmit the association information to a network device.

In a possible embodiment of the present application, the first association information includes one or more of: first sub-association information that is generated when the on-demand SI request is voluntarily triggered by the relay UE and on-demand SI is requested successfully; second sub-association information that is generated when the on-demand SI request is voluntarily triggered by the relay UE and the on-demand SI is requested unsuccessfully; third sub-association information that is generated when the relay UE plans to request for, but has not yet requested for, the on-demand SI; fourth sub-association information that is generated when the on-demand SI request is passively triggered by the relay UE and the on-demand SI is requested successfully; fifth sub-association information that is generated when the on-demand SI request is passively triggered by the relay UE and the on-demand SI is requested unsuccessfully; or sixth sub-association information that is generated when the on-demand SI request is passively triggered by the relay UE and the on-demand SI has not yet been requested. The on-demand SI request triggered by the relay UE passively includes an on-demand SI request triggered passively upon the receipt of an SI request message from a remote UE.

In a possible embodiment of the present application, the association information includes one or more of: a type of requested SI; the quantity of requests; a type of a UE requesting for the SI, the type of the UE including a relay UE and/or a remote UE; a quantity of UEs requesting for the SI; or IDs of UEs requesting for the SI.

In a possible embodiment of the present application, the information processing device further includes a first notification message transmission module configured to, in the case that the relay UE is in a connected state, transmit a first notification message to the network device, and the first notification message is used to notify the network device that the association information is stored in the relay UE.

In a possible embodiment of the present application, the first transmission module includes: a first obtaining request reception unit configured to receive a first association information obtaining request from the network device, the first association information obtaining request being used to request for the association information stored in the relay UE; and a first association information transmission unit configured to transmit the association information satisfying the first association information obtaining request to the network device in accordance with the first association information obtaining request.

In a possible embodiment of the present application, the association information further includes second association information that is generated when the on-demand SI request is voluntarily triggered by a remote UE. The first reception module includes an association information reception unit configured to receive the second association information from the remote UE. The second association information includes one or more of: association information that is generated when the on-demand SI request is triggered by the remote UE in a connected state on its own initiative and the on-demand SI request is requested successfully; association information that is generated when the on-demand SI request is triggered by the remote UE in the connected state on its own initiative and the on-demand SI request is requested unsuccessfully; association information that is generated when the remote UE in the connected state plans to request for, but has not yet requested for, the on-demand SI; association information that is generated when the remote UE in a non-connected state transmits a request to the relay UE unsuccessfully; association information that is generated when the remote UE in the non-connected state transmits a request to the relay UE successfully; or association information that is generated when the remote UE in the non-connected state plans to request for, but has not yet requested for, the on-demand SI.

In a possible embodiment of the present application, the first obtaining module includes: a first configuration information reception unit configured to receive first configuration information from the network device, the first configuration information being used to indicate whether the relay UE is to obtain the association information related to the on-demand SI request triggered by a remote UE; and a first reception unit configured to, in the case that the first configuration information indicates that the relay UE is to obtain the association information related to the on-demand SI request triggered by the remote UE, receive second association information from the remote UE, the second association information being association information that is generated when the on-demand SI request is triggered by the remote UE on its own initiative, and/or determine the on-demand SI request triggered passively upon the receipt of an SI request message from the remote UE, and obtain one or more of fourth sub-association information, fifth sub-association information or sixth sub-association information that is generated when the on-demand SI request is triggered passively.

In a possible embodiment of the present application, the first obtaining module includes a first association information obtaining unit configured to, in accordance with a designated UE state in first configuration information from the network device, the association information related to the on-demand SI request and generated in the designated UE state. The designated UE state includes one or more of a connected state, an idle state or an inactive state.

In still yet another aspect, the present application provides in some embodiments an information processing device, including a memory, a transceiver and a processor. The memory is configured to store therein a program instruction. The transceiver is configured to receive and transmit data under the control of the processor. The processor is configured to read the program instruction in the memory so as to obtain second association information that is generated when an on-demand SI request is triggered by a remote UE on its own initiative, and the transceiver is configured to transmit the second association information to a network device or a relay UE.

In a possible embodiment of the present application, the second association information includes one or more of: association information that is generated when the on-demand SI request is triggered by the remote UE in a connected state on its own initiative and on-demand SI is requested successfully; association information that is generated when the on-demand SI request is triggered by the remote UE in the connected state on its own initiative and the on-demand SI is requested unsuccessfully; association information that is generated when the remote UE in the connected state plans to request for, but has not yet requested for, the on-demand SI; association information that is generated when the remote UE in a non-connected state transmits a request to the relay UE unsuccessfully; association information that is generated when the remote UE in the non-connected state transmits a request to the relay UE successfully; or association information that is generated when the remote UE in the non-connected state plans to request for, but has not yet requested for, the on-demand SI.

In a possible embodiment of the present application, after the processor has obtained the second association information that is generated when the on-demand SI request is triggered by the remote UE on its own initiative, the transceiver is further configured to, in the case that the remote UE is in a connected state, transmit a second notification message to the network device, and the second notification message is used to notify the network device that the second association information is stored in the remote UE.

In a possible embodiment of the present application, the transceiver is specifically configured to: receive a second association information obtaining request from the network device, the second association information obtaining request being used to request association information stored in the remote UE; and transmit the association information satisfying the second association information obtaining request to the network device in accordance with the second association information obtaining request.

In a possible embodiment of the present application, the transceiver is specifically configured to receive second configuration information from the network device, and the second configuration information is used to indicate whether the remote UE obtains the second association information that is generated when the on-demand SI request is triggered by the remote UE on its own initiative.

In a possible embodiment of the present application, the processor is specifically configured to obtain, in accordance with a designated UE state in the second configuration information from the network device, the association information related to the on-demand SI request and generated in the designated UE state, and the designated UE state includes one or more of a connected state, an idle state or an inactive state.

In still yet another aspect, the present application provides in some embodiments an information processing device, including: a second obtaining module configured to obtain second association information that is generated when an on-demand SI request is triggered by a remote UE on its own initiative; and a second transmission module configured to transmit the second association information to a network device or a relay UE.

In a possible embodiment of the present application, the second association information includes one or more of: association information that is generated when the on-demand SI request is triggered by the remote UE in a connected state on its own initiative and on-demand SI is requested successfully; association information that is generated when the on-demand SI request is triggered by the remote UE in the connected state on its own initiative and the on-demand SI is requested unsuccessfully; association information that is generated when the remote UE in the connected state plans to request for, but has not yet requested for, the on-demand SI; association information that is generated when the remote UE in a non-connected state transmits a request to the relay UE unsuccessfully; association information that is generated when the remote UE in the non-connected state transmits a request to the relay UE successfully; or association information that is generated when the remote UE in the non-connected state plans to request for, but has not yet requested for, the on-demand SI.

In a possible embodiment of the present application, the information processing device further includes a second notification message transmission module configured to, in the case that the remote UE is in a connected state, transmit a second notification message to the network device, and the second notification message is used to notify the network device that the second association information is stored in the remote UE.

In a possible embodiment of the present application, the second transmission module includes: a second obtaining request reception unit configured to receive a second association information obtaining request from the network device, the second association information obtaining request being used to request association information stored in the remote UE; and a second association information transmission unit configured to transmit the association information satisfying the second association information obtaining request to the network device in accordance with the second association information obtaining request.

In a possible embodiment of the present application, the second obtaining module includes a configuration information reception unit configured to receive second configuration information from the network device, and the second configuration information is used to indicate whether the remote UE obtains the second association information that is generated when the on-demand SI request is triggered by the remote UE on its own initiative.

In a possible embodiment of the present application, the second obtaining module includes a second association information obtaining unit configured to obtain, in accordance with a designated UE state in the second configuration information from the network device, the association information related to the on-demand SI request and generated in the designated UE state, and the designated UE state includes one or more of a connected state, an idle state or an inactive state.

In still yet another aspect, the present application provides in some embodiments an information processing device, including a memory, a transceiver and a processor. The memory is configured to store therein a program instruction. The transceiver is configured to receive and transmit data under the control of the processor. The processor is configured to read the program instruction in the memory. The transceiver is configured to receive association information related to an on-demand SI request from a relay UE, and/or second association information from a remote UE. The association information includes first association information that is generated when the on-demand SI request is triggered by the relay UE, and the second association information is generated when the on-demand SI request is triggered by the remote UE on its own initiative.

In a possible embodiment of the present application, when the transceiver receives the association information, prior to receiving the association information related to the on-demand SI request from the relay UE, the transceiver is further configured to receive a first notification message from the relay UE in the connected state, and the first notification message is used to notify the network device that the association information is stored in the relay UE.

In a possible embodiment of the present application, when the transceiver receives the second association information, prior to receiving the second association information from the remote UE, the transceiver is further configured to receive a second notification message from the remote UE in the connected state, and the second notification message is used to notify the network device that the second association information is stored in the remote UE.

In a possible embodiment of the present application, when the transceiver receives the association information, prior to receiving the association information related to the on-demand SI request from the relay UE, the transceiver is further configured to transmit a first association information obtaining request to the relay UE, and the first association information obtaining request is used to request for the association information stored in the relay UE.

In a possible embodiment of the present application, when the transceiver receives the second association information, prior to receiving the second association information from the remote UE, the transceiver is further configured to transmit a second association information obtaining request to the remote UE, and the second association information obtaining request is used to request for the association information stored in the remote UE.

In a possible embodiment of the present application, when the transceiver receives the association information, prior to receiving the association information related to the on-demand SI request from the relay UE, the transceiver is further configured to transmit first configuration information to the relay UE, and the first configuration information is used to indicate whether the relay UE obtains the association information that is generated when the on-demand SI request is triggered by the remote UE.

In a possible embodiment of the present application, when the transceiver receives the second association information, prior to receiving the second association information from the remote UE, the transceiver is further configured to transmit second configuration information to the remote UE, and the second configuration information is used to indicate whether the remote UE obtains the second association information that is generated when the on-demand SI request is triggered by the remote UE on its own initiative.

In still yet another aspect, the present application provides in some embodiments an information processing device, including a reception module configured to receive association information related to an on-demand SI request from a relay UE, and/or second association information from a remote UE. The association information includes first association information that is generated when the on-demand SI request is triggered by the relay UE, and the second association information is generated when the on-demand SI request is triggered by the remote UE on its own initiative.

In a possible embodiment of the present application, the information processing device further includes a first notification message reception module configured to receive a first notification message from the relay UE in the connected state, and the first notification message is used to notify the network device that the association information is stored in the relay UE.

In a possible embodiment of the present application, the information processing device further includes a second notification message reception module configured to receive a second notification message from the remote UE in the connected state, and the second notification message is used to notify the network device that the second association information is stored in the remote UE.

In a possible embodiment of the present application, the information processing device further includes a first obtaining request transmission module configured to transmit a first association information obtaining request to the relay UE, and the first association information obtaining request is used to request for the association information stored in the relay UE.

In a possible embodiment of the present application, the information processing device further includes a second obtaining request transmission module configured to transmit a second association information obtaining request to the remote UE, and the second association information obtaining request is used to request for the association information stored in the remote UE.

In a possible embodiment of the present application, the information processing device further includes a first configuration information transmission module configured to transmit first configuration information to the relay UE, and the first configuration information is used to indicate whether the relay UE obtains the association information that is generated when the on-demand SI request is triggered by the remote UE.

In a possible embodiment of the present application, the information processing device further includes a second configuration information transmission module configured to transmit second configuration information to the remote UE, and the second configuration information is used to indicate whether the remote UE obtains the second association information that is generated when the on-demand SI request is triggered by the remote UE on its own initiative.

In still yet another aspect, the present application provides in some embodiments a processor-readable storage medium storing therein a computer program. The computer program is executed by a processor so as to implement the above-mentioned information processing methods.

In still yet another aspect, the present application provides in some embodiments a computer-readable storage medium storing therein a computer program. The computer program is executed by a computer so as to implement the above-mentioned information processing methods.

In still yet another aspect, the present application provides in some embodiments a chip product storing therein a computer program. The computer program is executed by the chip product so as to implement the above-mentioned information processing methods.

The present application at least has the following beneficial effects.

According to the embodiments of the present application, in a relay scenario, the relay UE and/or the remote UE obtain the association information related to the on-demand SI request, and transmit the association information to the network device for optimization. As a result, it is able to solve the problem in the relay scenario where it is impossible for the network device to accurately obtain the association information related to the on-demand SI request.

DETAILED DESCRIPTION

Figure 1:
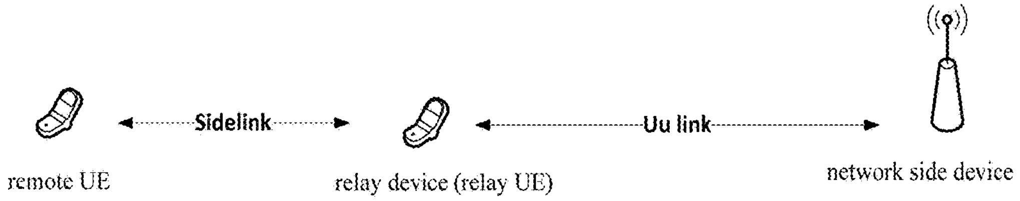
FIG. 1 is a schematic view showing a UE-to-network device relay according to one embodiment of the present application.

In order to make the objects, the technical solutions and the advantages of the present application more apparent, the present application will be described hereinafter in a clear and complete manner in conjunction with the drawings and embodiments. Obviously, the following embodiments merely relate to a part of, rather than all of, the embodiments of the present application, and based on these embodiments, a person skilled in the art may, without any creative effort, obtain the other embodiments, which also fall within the scope of the present application.

At first, some concepts involved in the embodiments of the present application will be described as follows.

NR SI

SI includes a Master Information Block (MIB) and a series of SIBs, and it is classified into Minimum SI and Other SI. The Minimum SI includes an MIB message and an SIB1 message which are transmitted through a Broadcast Channel (BCH) and a Downlink Shared Channel (DL-SCH) respectively, with a transmission mode of periodic broadcasting. The other SIBs are collectively called as Other SI, which includes all SI other than the Minimum SI, with a transmission mode of periodic or on-demand broadcasting. Different SIBs are included in one or more SI messages, and transmitted through the DL-SCH.

Other SI

For ordinary Other SI, its transmission modes include periodic broadcasting and on-demand broadcasting. However, for the SI related to a Public Warning System (PWS), a special transmission mechanism is adopted.

Periodic Broadcasting Mode

The SI message is always transmitted by a network device in an SI time window corresponding to the SI message and calculated through a formula.

On-Demand Broadcasting Mode

When there is no request from a UE, the network device does not transmit the SI message. When the UE transmits a request to the network device, the network device transmits the SI message within a certain time period in the SI time window corresponding to the SI message and calculated through the formula.

PWS

It includes an Earthquake and Tsunami Warning System (ETWS) and a Commercial Mobile Alert Service (CMAS), and corresponding SIB6/7/8 are incapable of being obtained in an on-demand manner, nor being broadcast periodically. When ETWS/CMAS information needs to be transmitted, the network device transmits a PWS indicator through a paging short message, and meanwhile transmits real SIB6/7/8 to the UE.

Requesting SI in an On-Demand SI Mode

For the on-demand broadcasting mode, two optional modes have been defined in the protocol, and the network device may select one of them for the UE according to the practical need. The two modes are both implemented through triggering a random access procedure.

In an Msg1-based mode (where such information as a value of a Preamble, a dedicated Random Access Channel (RACH) resource and a mask is provided), when the UE has received an SI-Request Config/SI-Request Config Supplementary Uplink (SUL) in SIB1 scheduling information, an Msg1-based SI request mode is used by default, i.e., all pieces of SI which have not yet broadcast are requested for. That is to say, each piece of SI which has not yet broadcast up to now is requested for individually.

In an Msg3-based mode (where a bitmap is adopted), when the SIB1 scheduling information received by the UE does not include the SI-Request Config/SI-Request Config SUL, an Msg3-based contention-based random access mode is used by default, i.e., one or more pieces of desired SI is requested on demand.

On-Demand SI Request in a Connected State

In a current mechanism, the on-demand SI request in the connected state merely includes SIB12, SIB13 and SIB14 related to Sidelink as well as an SI request related to positioning. The UE requests for the desired SIB through a dedicated SIB request message, and the network device transmits the SI requested by the UE through an RRC reconfiguration message. When transmitting the dedicated SIB request message, the EU starts a Prohibit timer, and the UE does not transmit the on-demand SI request to the network device any more until the expiration of the timer, so as to prevent the UE from triggering the on-demand SI request too frequently.

On-Demand SI Request in an Idle State/Inactive State

In the current mechanism, the on-demand SI request in the idle state/inactive state is used to request for all the SI other than the Minimum SI. The UE requests for the desired SI in the Msg1-based or Msg3-based mode, and the network device transmits the SI requested by the UE through broadcasting.

In order to extend network coverage, as a solution, a relay is introduced. The relay is a terminal having a relay function.

For a UE-to-Network relay, an interface between the relay and the network device is a Uu interface, and an interface between the relay and a remote UE is a Sidelink interface or a PC5 interface. A link between the relay and a network is called as a Backhaul link (BH) for the remote UE.

For a UE-to-UE relay, data transmission is performed between two remote UEs through the relay UE.

FIG. 1 shows the UE-to-Network relay.

The requesting and obtaining, by the remote UE, the on-demand SI

As discussed and approved in the Rel-17 Sidelink Relay project, the remote UE requests for the SI through the relay UE. When the remote UE is in the idle state/inactive state, the remote UE requests for the SI from the relay UE through a PC5-RRC message, and the relay UE triggers a conventional SI obtaining procedure to obtain the SI and forwards it to the remote UE. When the remote UE is in the connected state, the remote UE obtains the SI through the dedicated SIB request.

The present application will be described hereinafter in conjunction with the drawings and embodiments.

The present application provides in some embodiments an information processing method and an information processing device. The method and the device are based on a same inventive concept. A principle of the method for solving the problem is similar to that of the device, so the implementation of the device may refer to that of the method, which will not be particularly defined herein.

Figure 2:
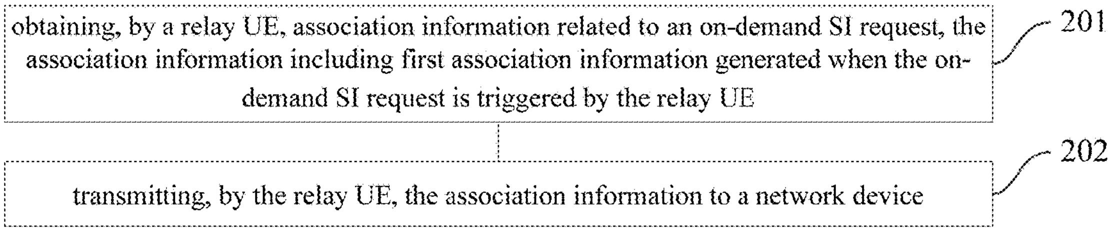
FIG. 2 is a flow chart of an information processing method according to one embodiment of the present application.

As shown in FIG. 2, the present application provides in some embodiments an information processing method performed by a relay UE, which includes the following steps.

Step 201: obtaining, by the relay UE, association information related to an on-demand SI request, the association information including first association information that is generated when the on-demand SI request is triggered by the relay UE.

In the embodiments of the present application, in a relay scenario, the first association information is generated when the relay UE triggers (or plans to trigger) the on-demand SI request, and then the relay UE obtains (collects) the first association information.

Step 202: transmitting, by the relay UE, the association information to a network device.

In the embodiments of the present application, in the relay scenario, after Step 201, the relay UE transmits the association information at least including the first association information to the network device for optimization.

It should be appreciated that, the network device in the embodiments of the present application includes, but not limited to, a base station or a Central Unit (CU).

In a possible embodiment of the present application, the first association information includes one or more of: first sub-association information that is generated when the on-demand SI request is voluntarily triggered by the relay UE and on-demand SI is requested successfully; second sub-association information that is generated when the on-demand SI request is voluntarily triggered by the relay UE and the on-demand SI is requested unsuccessfully; third sub-association information that is generated when the relay UE plans to request for, but has not yet requested for, the on-demand SI; fourth sub-association information that is generated when the on-demand SI request is passively triggered by the relay UE and the on-demand SI is requested successfully; fifth sub-association information that is generated when the on-demand SI request is passively triggered by the relay UE and the on-demand SI is requested unsuccessfully; or sixth sub-association information that is generated when the on-demand SI request is passively triggered by the relay UE and the on-demand SI has not yet been requested. The on-demand SI request triggered by the relay UE passively includes an on-demand SI request triggered passively upon the receipt of an SI request message from a remote UE.

Here, the sixth sub-association information is sub-association information which does not need to be requested by the relay UE through the on-demand SI request, because the SI requested by the remote UE through the on-demand SI request has already been stored in the relay UE or has already been broadcast.

It should be appreciated that, the relay UE obtains, through the following three modes, the first association information that is generated when the on-demand SI request is triggered.

First mode: the relay UE merely collects the association information that is generated when the on-demand SI request is triggered by itself, but does not collect the association information that is generated when the on-demand SI request is triggered by the remote UE. At this time, the first association information includes: the first sub-association information that is generated when the on-demand SI request is voluntarily triggered by the relay UE and the on-demand SI is requested successfully; the second sub-association information that is generated when the on-demand SI request is voluntarily triggered by the relay UE and the on-demand SI is requested unsuccessfully; and the third sub-association information that is generated when the relay UE plans to request for, but has not yet requested for, the on-demand SI.

Second mode: the relay UE collects the association information that is generated when the on-demand SI request is triggered by itself, and the association information that is generated when the on-demand SI request is passively triggered by the relay UE in accordance with an SI request message from the remote UE. The association information that is generated when the on-demand SI request is triggered by the remote UE is marked so as to be differentiated by a network. At this time, the first association information includes: the first sub-association information that is generated when the on-demand SI request is voluntarily triggered by the relay UE and the on-demand SI is requested successfully; the second sub-association information that is generated when the on-demand SI request is voluntarily triggered by the relay UE and the on-demand SI is requested unsuccessfully; the third sub-association information that is generated when the relay UE plans to request for, but has not yet requested for, the on-demand SI; the fourth sub-association information that is generated when the on-demand SI request is passively triggered by the relay UE and the on-demand SI is requested successfully; the fifth sub-association information that is generated when the on-demand SI request is passively triggered by the relay UE and the on-demand SI is requested unsuccessfully; and the sixth sub-association information that is generated when the on-demand SI request is passively triggered by the relay UE and the on-demand SI has not yet been requested.

Third mode: the remote UE does not collect the association information that is generated when the on-demand SI request is triggered by itself, and the relay UE collects the association information that is generated when the on-demand SI request is triggered by itself and the association information that is generated when the on-demand SI request is triggered by the remote UE. At this time, the first association information includes: the first sub-association information that is generated when the on-demand SI request is voluntarily triggered by the relay UE and the on-demand SI is requested successfully; the second sub-association information that is generated when the on-demand SI request is voluntarily triggered by the relay UE and the on-demand SI is requested unsuccessfully; the third sub-association information that is generated when the relay UE plans to request for, but has not yet requested for, the on-demand SI; the fourth sub-association information that is generated when the on-demand SI request is passively triggered by the relay UE and the on-demand SI is requested successfully; the fifth sub-association information that is generated when the on-demand SI request is passively triggered by the relay UE and the on-demand SI is requested unsuccessfully; and the sixth sub-association information that is generated when the on-demand SI request is passively triggered by the relay UE and the on-demand SI has not yet been requested.

When the association information is marked so as to be differentiated by the network, the network device, upon the receipt of the association information, knows that the marked association information is requested by the relay UE for the remote UE, and the unmarked association information is requested by the relay UE for itself.

In addition, in the embodiments of the present application, the first sub-association information that is generated when the on-demand SI request is voluntarily triggered by the relay UE and the on-demand SI is requested successfully may be understood as sub-association information for which the relay UE plans to request; the second sub-association information that is generated when the on-demand SI request is voluntarily triggered by the relay UE and the on-demand SI is requested unsuccessfully may be understood as sub-association information for which the relay UE plans to request; the third sub-association information that is generated when the relay UE plans to request for, but has not yet requested for, the on-demand SI may be understood as sub-association information for which the relay UE plans to request; the fourth sub-association information that is generated when the on-demand SI request is passively triggered by the relay UE and the on-demand SI is requested successfully may be understood as sub-association information for which the relay UE plans to request; the fifth sub-association information that is generated when the on-demand SI request is passively triggered by the relay UE and the on-demand SI is requested unsuccessfully may be understood as sub-association information for which the relay UE plans to request; and the sixth sub-association information that is generated when the on-demand SI request is passively triggered by the relay UE and the on-demand SI has not yet been requested may be understood as sub-association information for which the relay UE plans to request.

In a possible embodiment of the present application, the association information includes one or more of: a type of requested SI; the quantity of requests; a type of a UE requesting for the SI, the type of the UE including a relay UE and/or a remote UE; a quantity of UEs requesting for the SI; or an ID of the UE requesting for the SI.

In other words, in the embodiments of the present application, one or more pieces of the following information is simultaneously recorded in the association information: the type of requested SI; the quantity of requests; the type of the UE requesting for the SI (to be specific, when the relay UE collects the association information each time, whether the on-demand SI is requested by the relay UE or the remote UE or both is indicated); the quantity of remote UEs requesting for the SI (to be specific, the relay UE is in communication with a plurality of remote UEs, so when the relay UE collects the association information each time, information about the quantity of remote UEs requesting for the on-demand SI is indicated); or the ID of the UE requesting for the SI (to be specific, identification information about each remote UE is recorded, and when the relay UE collects the association information each time, the remote UE for which the association information is requested is indicated).

In the embodiments of the present application, the association information based on the remote UE is individually recorded in a new entry or a new report, or recorded together with the association information for the relay UE itself, which will not be particularly defined herein.

In a possible embodiment of the present application, subsequent to obtaining the association information related to the on-demand SI request, the information processing method further includes: transmitting a first notification message to the network device when the relay UE is in a connected state, and the first notification message is used to notify the network device that the association information is stored in the relay UE.

It should be appreciated that, when the relay UE is in the connected state, the relay UE reports the first notification message in an uplink complete message, and the first notification message is used to notify the network device of such information as a UE state and a UE type stored in the relay UE and related to the association information.

In a possible embodiment of the present application, in the case that the relay UE collects the association information that is generated when the on-demand SI request is triggered by the relay UE itself (triggered on its own initiative) as well as the association information that is generated when the on-demand SI request is triggered on the basis of the remote UE (triggered passively), the relay UE reports one or two separate first notification messages in the uplink complete message, so as to indicate that the association information for the relay UE and the remote UE is stored in the relay UE.

In a possible embodiment of the present application, the transmitting, by the relay UE, the association information to the network device includes: receiving a first association information obtaining request from the network device, the first association information obtaining request being used to request for the association information stored in the relay UE; and transmitting the association information satisfying the first association information obtaining request to the network device in accordance with the first association information obtaining request.

It should be appreciated that, when the network device wants to obtain the association information collected by the relay UE, the network device transmits the first association information obtaining request to the relay UE, so as to instruct the relay UE to report the association information. Upon the receipt of the first association information obtaining request, the relay UE reports the association information stored in the relay UE.

It should be further appreciated that, in the case that the relay UE collects the association information for the relay UE itself as well as the association information for the remote UE, the network device requests the relay UE to report the association information for the relay UE and/or the association information for the remote UE. In other words, the network device transmits one first association information obtaining request to request the relay UE to report the association information for the relay UE and/or the association information for the remote UE, or transmits two first association information obtaining requests to request the relay UE to report the association information for the relay UE and the association information for the remote UE respectively.

Illustratively, when the first association information obtaining request includes a UE type, the relay UE transmits the stored association information corresponding to the UE type to the network device. For example, when the UE type is a remote UE, the relay UE transmits the stored association information corresponding to the remote UE to the network device. When the first association information obtaining request includes a UE state, the relay UE transmits the stored association information corresponding to the UE state to the network device. For example, when the UE state is a connected state, the relay UE transmits the stored association information corresponding to the connected state to the network device. When the first association information obtaining request includes the quantity of UEs, the relay UE transmits the stored association information corresponding to the quantity of UEs to the network device. For example, when the quantity of UEs is N, the relay UE transmits the stored associated information corresponding to the N number of UEs to the network device. When the first association information obtaining request includes an ID of the UE, the relay UE transmits the stored association information corresponding to the ID of the UE to the network device.

In the embodiments of the present application, in the case that the relay UE collects the association information that is generated when the on-demand SI request is triggered by the remote UE, the remote UE does not collect the association information that is generated when the on-demand SI request is triggered by the remote UE itself, and the relay UE collects the association information for the relay UE as well as the association information for the remote UE. Alternatively, the relay UE does not collect the association information that is generated when the on-demand SI request is triggered by the remote UE on its own initiative, and instead, the remote UE collects the association information for the remote UE and transmits the collected association information to the relay UE. Hence, in a possible embodiment of the present application, the method further includes the following.

In a possible embodiment of the present application, the association information further includes second association information that is generated when the on-demand SI request is voluntarily triggered by a remote UE. The obtaining, by the relay UE, the association information related to the on-demand SI request includes receiving the second association information from the remote UE. The second association information includes one or more of: association information that is generated when the on-demand SI request is triggered by the remote UE in a connected state on its own initiative and the on-demand SI request is requested successfully; association information that is generated when the on-demand SI request is triggered by the remote UE in the connected state on its own initiative and the on-demand SI request is requested unsuccessfully; association information that is generated when the remote UE in the connected state plans to request for, but has not yet requested for, the on-demand SI; association information that is generated when the remote UE in a non-connected state transmits a request to the relay UE unsuccessfully; association information that is generated when the remote UE in the non-connected state transmits a request to the relay UE successfully; or association information that is generated when the remote UE in the non-connected state plans to request for, but has not yet requested for, the on-demand SI.

In other words, the remote UE transmits the association information that is generated when the on-demand SI request is triggered by the remote UE in the connected state on its own initiative and the on-demand SI request is requested successfully to the relay UE, so that the relay UE collects, records and reports the association information. The association information that is generated when the on-demand SI request is triggered by the remote UE in the connected state on its own initiative and the on-demand SI request is requested successfully is association information for which the remote UE plans to request.

Alternatively, the remote UE transmits the association information that is generated when the on-demand SI request is triggered by the remote UE in the connected state on its own initiative and the on-demand SI request is requested unsuccessfully to the remote UE, so that the relay UE collects, records and reports the association information. The association information that is generated when the on-demand SI request is triggered by the remote UE in the connected state on its own initiative and the on-demand SI request is requested unsuccessfully is association information for which the remote UE plans to request.

Alternatively, the remote UE transmits the association information that is generated when the remote UE in the connected state plans to request for, but has not yet requested for, the on-demand SI to the remote UE, so that the relay UE collects, records and reports the association information. The association information that is generated when the remote UE in the connected state plans to request for, but has not yet requested for, the on-demand SI is association information for which the remote UE plans to request.

Alternatively, the remote UE transmits the association information that is generated when the remote UE in the non-connected state transmits a request to the relay UE unsuccessfully, so that the relay UE collects, records and reports the association information. The association information that is generated when generated when the remote UE in the non-connected state transmits the request to the relay UE unsuccessfully is association information for which the remote UE plans to request.

Alternatively, the remote UE transmits the association information that is generated when the remote UE in the non-connected state transmits a request to the relay UE successfully to the relay UE, so that the relay UE collects, records and reports the association information. The association information that is generated when the remote UE in the non-connected state transmits the request to the relay UE successfully is association information for which the remote UE plans to request.

Alternatively, the remote UE transmits the association information that is generated when the remote UE in the non-connected state plans to request for, but has not yet requested for, the on-demand SI to the relay UE, so that the relay UE collects, records and reports the association information. The association information that is generated when the remote UE in the non-connected state plans to request for, but has not yet requested for, the on-demand SI is association information for which the remote UE plans to request.

Based on the above, the relay UE may collect the association information in a more accurate manner than before.

It should be appreciated that, when the remote UE transmits a request to the relay UE unsuccessfully, it means that the remote UE transmits the request for the on-demand SI to the relay UE unsuccessfully.

In the above-mentioned first mode, the relay UE does not collect the second association information for the remote UE. Here, the second association information is obtained by the remote UE.

In the above-mentioned second mode, when the relay UE does not collect the second association information that is generated when the on-demand SI request is triggered by the remote UE on its own initiative but collects the association information that is generated when the on-demand SI request is triggered passively upon the receipt of the SI request message from the remote UE, the second association information needs to be collected by the remote UE and transmitted to the relay UE. Here, the second association information includes: the association information that is generated when the on-demand SI request is triggered by the remote UE in the connected state on its own initiative and the on-demand SI request is requested successfully; the association information that is generated when the on-demand SI request is triggered by the remote UE in the connected state on its own initiative and the on-demand SI request is requested unsuccessfully; the association information that is generated when the remote UE in the connected state plans to request for, but has not yet requested for, the on-demand SI; the association information that is generated when the remote UE in the non-connected state transmits a request to the relay UE unsuccessfully; and the association information that is generated when the remote UE in the non-connected state plans to request for, but has not yet requested for, the on-demand SI.

In the above-mentioned third mode, the second association information received from the remote UE includes: the association information that is generated when the on-demand SI request is triggered by the remote UE in the connected state on its own initiative and the on-demand SI request is requested successfully; the association information that is generated when the on-demand SI request is triggered by the remote UE in the connected state on its own initiative and the on-demand SI request is requested unsuccessfully; the association information that is generated when the remote UE in the connected state plans to request for, but has not yet requested for, the on-demand SI; the association information that is generated when the remote UE in the non-connected state transmits a request to the relay UE unsuccessfully; the association information that is generated when the remote UE in the non-connected state transmits a request to the relay UE successfully; and the association information that is generated when the remote UE in the non-connected state plans to request for, but has not yet requested for, the on-demand SI.

In a possible embodiment of the present application, the obtaining, by the relay UE, the association information related to the on-demand SI request includes: obtaining first configuration information from the network device, the first configuration information being used to indicate whether the relay UE is to obtain the association information related to the on-demand SI request triggered by a remote UE; in the case that the first configuration information indicates that the relay UE is to obtain the association information related to the on-demand SI request triggered by the remote UE, receiving second association information from the remote UE, the second association information being association information that is generated when the on-demand SI request is triggered by the remote UE on its own initiative; and/or determining the on-demand SI request triggered passively upon the receipt of an SI request message from the remote UE, and obtaining one or more of fourth sub-association information, fifth sub-association information or sixth sub-association information that is generated when the on-demand SI request is triggered passively.

It should be appreciated that, how to collect the association information related to the on-demand SI request triggered by the remote UE is determined by the relay UE itself, or configured by the network device. For example, the relay UE obtains the association information related to the on-demand SI request triggered by the remote UE in accordance with the first configuration information from the network device, and in the case that the first configuration information indicates the relay UE to obtain the association information related to the on-demand SI request triggered by the remote UE, the association information that is generated when the on-demand SI request is triggered by the remote UE on its own initiative.

Alternatively, the relay UE directly obtains one or more of the fourth sub-association information, the fifth sub-association information or the sixth sub-association information that is generated when the on-demand SI request is triggered passively in the case that the on-demand SI request is triggered passively upon the receipt of the SI request message from the remote UE.

In a possible embodiment of the present application, the obtaining, by the relay UE, the association information related to the on-demand SI request includes obtaining, in accordance with a designated UE state in first configuration information from the network device, the association information related to the on-demand SI request and generated in the designated UE state. The designated UE state includes one or more of a connected state, an idle state or an inactive state.

It should be appreciated that, in the case that the relay UE obtains the association information related to the on-demand SI request triggered by the remote UE in accordance with the first configuration information from the network device, the first configuration information from the network device includes one or more of first collection indication information or second collection indication information. The first collection indication information is used to instruct the relay UE to collect the association information that is generated when the on-demand SI request is triggered by the remote UE in all states or a specific state on its own initiative. All the states or the specific state of the remote UE are the designated UE states. The second collection indication information is used to instruct the relay UE not to collect the association information that is generated when the on-demand SI request is triggered by the remote UE in all states or a specific state on its own initiative. States other than all the states or the specific state of the remote UE are the designated UE states.

It should be further appreciated that, the designated UE is a relay UE or a remote UE.

In the embodiments of the present application, when the network device wants to obtain the association information related to the on-demand SI request and generated in a designated UE state from the relay UE, the first configuration information is configured in such a manner as to instruct the relay UE to collect the association information related to the on-demand SI request and generated in the designated UE state.

For example, when the first configuration information includes a connected state of the remote UE, the relay UE obtains the association information related to the on-demand SI request and generated by the remote UE in the connected state. For another example, when the first configuration information includes an idle state of the relay UE, the relay UE obtains the association information related to the on-demand SI request and generated by the relay UE in the idle state.

According to the embodiments of the present application, the UE for collecting the association information that is generated when the on-demand SI request is triggered by the remote UE is configured, i.e., the relay UE collects the association information that is generated when the on-demand SI request is triggered passively upon the receipt of the SI request message from the remote UE, or the remote UE collects by itself the association information that is generated when the on-demand SI request is triggered by the remote UE (the on-demand SI request is triggered by the remote UE when the remote UE is in the connected state and/or when the remote UE is in the idle state, the on-demand SI request is triggered by the relay UE). As a result, it is able for the relay UE to accurately obtain the association information related to the on-demand SI request for the relay UE and/or the remote UE, and report the association information to the network device for optimization.

Figure 3:
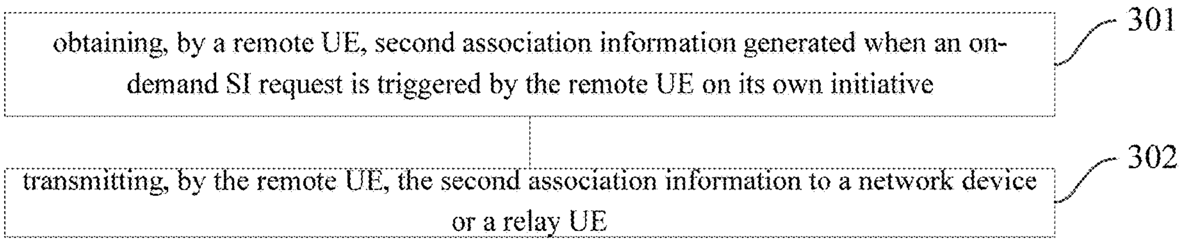
FIG. 3 is another flow chart of the information processing method according to one embodiment of the present application.

As shown in FIG. 3, the present application further provides in some embodiments an information processing method performed by a remote UE, which includes the following steps.

Step 301: obtaining, by the remote UE, second association information that is generated when an on-demand SI request is triggered by the remote UE on its own initiative.

In the embodiments of the present application, the second association information is generated when the on-demand SI request is triggered by the remote UE on its own initiative, and the remote UE triggers an information obtaining procedure to obtain (collect) the second association information.

Step 302: transmitting, by the remote UE, the second association information to a network device or a relay UE.

In the embodiments of the present application, in a relay scenario, subsequent to Step 301, the remote UE accurately obtains the second association information corresponding to the on-demand SI request, and then directly transmits the second association information to the network device, or transmits the second association information to the network device through the relay UE, for the subsequent optimization.

It should be appreciated that, the network device in the embodiments of the present application is, but not limited to, a base station or a CU.

In a possible embodiment of the present application, the second association information includes one or more of: association information that is generated when the on-demand SI request is triggered by the remote UE in a connected state on its own initiative and on-demand SI is requested successfully; association information that is generated when the on-demand SI request is triggered by the remote UE in the connected state on its own initiative and the on-demand SI is requested unsuccessfully; association information that is generated when the remote UE in the connected state plans to request for, but has not yet requested for, the on-demand SI; association information that is generated when the remote UE in a non-connected state transmits a request to the relay UE unsuccessfully; association information that is generated when the remote UE in the non-connected state transmits a request to the relay UE successfully; or association information that is generated when the remote UE in the non-connected state plans to request for, but has not yet requested for, the on-demand SI.

It should be appreciated that, when the association information reported to the network side device, in the above-mentioned first mode, the relay UE merely collects the association information that is generated when the on-demand SI request is triggered by the relay UE itself, but does not collect the association information that is generated when the on-demand SI request is triggered by the remote UE. At this time, the remote UE collects the association information that is generated when the on-demand SI request is triggered by the remote UE in the connected state and the non-connected state. The second association information includes: the association information that is generated when the on-demand SI request is triggered by the remote UE in the connected state on its own initiative and the on-demand SI request is requested successfully; the association information that is generated when the on-demand SI request is triggered by the remote UE in the connected state on its own initiative and the on-demand SI request is requested unsuccessfully; the association information that is generated when the remote UE in the connected state plans to request for, but has not yet requested for, the on-demand SI; the association information that is generated when the remote UE in the non-connected state transmits a request to the relay UE unsuccessfully; the association information that is generated when the remote UE in the non-connected state transmits a request to the relay UE successfully; and the association information that is generated when the remote UE in the non-connected state plans to request for, but has not yet requested for, the on-demand SI.

In the above-mentioned second mode, the relay UE collects the association information that is generated when the on-demand SI request is triggered by the relay UE itself as well as the association information that is generated when the on-demand SI request is triggered passively upon the receipt of the SI request message from the remote UE. At this time, the remote UE collects the association information that is generated when the on-demand SI request is triggered by the remote UE in the connected state as well as the association information that is generated when the remote UE in the non-connected state transmits a request to the relay UE. The second association information unsuccessfully includes: the association information that is generated when the on-demand SI request is triggered by the remote UE in the connected state on its own initiative and the on-demand SI request is requested successfully; the association information that is generated when the on-demand SI request is triggered by the remote UE in the connected state on its own initiative and the on-demand SI request is requested unsuccessfully; the association information that is generated when the remote UE in the connected state plans to request for, but has not yet requested for, the on-demand SI; the association information that is generated when the remote UE in the non-connected state transmits a request to the relay UE unsuccessfully; and the association information that is generated when the remote UE in the non-connected state plans to request for, but has not yet requested for, the on-demand SI.

In the above-mentioned third mode, the remote UE does not collect the association information that is generated when the on-demand SI request is triggered by the remote UE itself, and the relay UE collects the association information that is generated when the on-demand SI request is triggered by the relay UE itself as well as the association information that is generated when the on-demand SI request is triggered by the remote UE. At this time, the remote UE does not collect the association information that is generated when the remote UE is in the connected state or non-connected state. Of course, when the relay UE collects the association information in the third mode, the remote UE transmits the second association information that is generated when the on-demand SI request is triggered by the remote UE on its own initiative to the relay UE, so as to help the relay UE to collect the association information and report it to the network side device.

In a possible embodiment of the present application, subsequent to obtaining the second association information that is generated when the on-demand SI request is triggered by the remote UE on its own initiative, the information processing method further includes, in the case that the remote UE is the connected state, transmitting a second notification message to the network device, and the second notification message is used to notify the network device that the second association information is stored in the remote UE.

In the embodiments of the present application, when the remote UE is in the connected state, the second notification message is transmitted in an uplink complete message, so as to notify the network device that the second association information is stored in the remote UE.

In a possible embodiment of the present application, the transmitting, by the remote UE, the second association information to the network device includes: receiving a second association information obtaining request from the network device, the second association information obtaining request being used to request association information stored in the remote UE; and transmitting the association information satisfying the second association information obtaining request to the network device in accordance with the second association information obtaining request.

It should be appreciated that, when the network device wants to obtain the second association information collected by the remote UE, it transmits the second association information obtaining request to the remote UE, so as to instruct the remote UE to report the association information. Upon the receipt of the second association information, the remote UE reports the association information stored in the remote UE.

Illustratively, when the second association information obtaining request includes the UE state, the remote UE transmits the stored association information corresponding to the UE state to the network device. For example, when the UE state is the connected state, the remote UE transmits the stored association information corresponding to the connected state to the network device.

In a possible embodiment of the present application, the obtaining, by the remote UE, the second association information that is generated when the on-demand SI request is triggered by the remote UE on its own initiative includes receiving second configuration information from the network device, and the second configuration information is used to indicate whether the remote UE obtains the second association information that is generated when the on-demand SI request is triggered by the remote UE on its own initiative.

It should be appreciated that, how to collect, by the remote UE, the second association information is also configured by the network device. For example, the remote UE obtains the second association information that is generated when the on-demand SI request is triggered by the remote UE on its own initiative in accordance with the second configuration information from the network device.

It should be further appreciated that, in the second configuration information, the configuration information for indicating whether the remote UE obtains the second association information that is generated when the on-demand SI request is triggered by the remote UE on its own initiative is suitable for an air interface and an interface, and the interface includes an NG interface, an SI interface or an F1 interface.

In a possible embodiment of the present application, the obtaining, by the remote UE, the association information related to the on-demand SI request includes obtaining, in accordance with a designated UE state in the second configuration information from the network device, the association information related to the on-demand SI request and generated in the designated UE state. The designated UE state includes one or more of a connected state, an idle state or an inactive state.

The remote UE obtains the second association information that is generated when the on-demand SI request is triggered by the remote UE on its own initiative in accordance with the second configuration information from the network device.

It should be appreciated that, in the case that the remote UE obtains the association information that is generated when the on-demand SI request is triggered by the remote UE in accordance with the second configuration information from the network device, the second configuration information from the network device includes one or more of third collection indication information or fourth collection indication information. The third collection indication information is used to instruct the remote UE to collect the association information that is generated when the on-demand SI request is triggered by the remote UE in all states or a specific state on its own initiative. All the states or the specific state of the remote UE are the designated UE states. The fourth collection indication information is used to instruct the remote UE not to collect the association information that is generated when the on-demand SI request is triggered by the remote UE in all states or a specific state on its own initiative. Here, states other than all the states or the specific state of the remote UE are the designated UE states.

It should be further appreciated that, the third collection indication information and/or the fourth collection indication information in the second configuration information are suitable for an air interface and an interface, and the interface includes an NG interface, an SI interface or an F1 interface.

In the embodiments of the present application, when the network device wants to obtain the association information related to the on-demand SI request and generated in the designated UE state from the remote UE, the second configuration information is configured in such a manner as to instruct the remote UE to collect the association information related to the on-demand SI request and generated in the designated UE state.

For example, when the second configuration information includes the connected state, the remote UE obtains the association information related to the on-demand SI request and generated by the remote UE in the connected state.

In the embodiments of the present application, the remote UE accurately obtains the association information related to the on-demand SI request, and reports it to the network device for optimization.

It should be appreciated that, the above-mentioned description about the information processing method performed by the remote UE is suitable for the information processing method performed by the relay UE with a same technical effect.

A procedure of collecting, by the remote UE and the relay UE respectively, the association information corresponding to the on-demand SI request will be described hereinafter in conjunction with a specific embodiment.

When the remote UE in an idle state/inactive state/Out Of Coverage (OOC) state/connected state collects the association information corresponding to the on-demand SI request, the association information (the second association information) obtained by the remote UE probably includes such information as a type of the collected SI and the quantity of requests. When the remote UE enters the connected state, the indication information (the second notification message) is transmitted through the uplink complete message, so as to indicate that the association information is stored in the remote UE. When the network device wants to obtain the association information, it transmits a request (the second association information obtaining request) to the remote UE, so as to instruct the remote UE to report the association information. Upon the receipt of the request, the remote UE reports the stored association information.

When the relay UE in the idle state/inactive state/OOC state/connected state collects the association information corresponding to the on-demand SI request, the association information (the first association information) obtained by the relay UE probably includes such information as a type of the collected SI and the quantity of requests. When the relay UE enters the connected state, the indication information (the first notification message) is transmitted through the uplink complete message, so as to indicate that the association information is stored in the relay UE. When the network device wants to obtain the association information, it transmits a request (the first association information obtaining request) to the relay UE, so as to instruct the relay UE to report the association information. Upon the receipt of the request, the relay UE reports the stored association information.

How to collect the association information by the relay UE and the remote UE may also be configured by the network device. To be specific, the configuration information from the network device includes the following two pieces of information: first configuration information used to instruct the relay UE not to collect the association information corresponding to the on-demand SI request and generated by the remote UE, and second configuration information used to instruct the remote UE to collect the association information corresponding to the on-demand SI request and generated by the remote UE in all states.

A procedure of collecting the association information corresponding to the on-demand SI request and generated by the remote UE in two parts will be further described hereinafter in conjunction with a specific embodiment.

The remote UE in the connected state collects the association information corresponding to the on-demand SI request and generated by the remote UE. When the remote UE in the idle state/inactive state/OOC state transmits unsuccessfully the association information corresponding to the on-demand SI request and generated by the remote UE to the relay UE, the remote UE collects the current association information corresponding to the on-demand SI request, so as to obtain the association information (the second association information) probably including such information as a type of the collected SI and the quantity of requests. When the remote UE enters the connected state, the indication information (the second notification message) is transmitted through the uplink complete message, so as to indicate that the association information is stored in the remote UE. When the network device wants to obtain the association information, it transmits a request (the second association information obtaining request) to the remote UE, so as to instruct the remote UE to report the association information. Upon the receipt of the request, the remote UE reports the stored association information.

The relay UE in the idle state/inactive state/connected state collects the association information corresponding to the on-demand SI request and generated by the remote UE. In addition, the relay UE in the idle state/inactive state/connected state further collects the association information corresponding to the on-demand SI request and generated upon the receipt of the request from the remote UE in the idle state/inactive state/OOC state, so as to obtain the association information probably including such information as a type of the collected SI and the quantity of requests. The relay UE further collects one or more of following pieces of information. When the relay UE collects the association information each time, whether a current on-demand SI request is from the relay UE, or from the remote UE or from both parties is indicated. In addition, when the relay UE collects the association information each time, remote UEs for which the SI is requested as well as the quantity of remote UEs are indicated. Furthermore, identification information about each remote UE is recorded.

The association information generated in accordance with the request from the remote UE is stored separately in a new entry or a new report.

When the relay UE enters the connected state, one piece of, or two pieces of, indication information (the first notification message) is transmitted through the uplink complete message to indicate that the association information for the relay UE and the remote UE is stored in the relay UE. When the network device wants to obtain the association information, it transmits one request or two requests (the first association information obtaining request) to the relay UE, so as to instruct the relay UE to report the association information for the relay UE and/or the remote UE. Upon the receipt of the indication information, the relay UE reports the stored association information.

How to collect the association information by the relay UE and the remote UE may also be configured by the network device. To be specific, the configuration information from the network device includes the following two pieces of information: first configuration information used to instruct the relay UE to collect the association information generated by the remote UE in the idle state/inactive state/OCC state, and second configuration information used to instruct the remote UE to collect the association information generated by the remote UE in the connected state and the association information generated by the remote UE in the idle state/inactive state/OOC state.

A procedure in which the relay UE collects the association information corresponding to the on-demand SI request and the remote UE does not collect the association information corresponding to the on-demand SI request will be described hereinafter in conjunction with a specific embodiment.

The remote UE in the idle state/inactive state/OOC state/connected state does not collect the association information corresponding to the on-demand SI request (the second association information).

The relay UE in the idle state/inactive state/connected state collects the association information corresponding to the on-demand SI request and generated by the relay UE itself, and further collects the association information corresponding to the on-demand SI request and generated by the remote UE in accordance with the request from the remote UE, so as to obtain the association information including such information as a type of the requested SI and the quantity of requests. The relay UE further collects one or more of the following pieces of information. When the relay UE collects the association information each time, whether a current on-demand SI request is from the relay UE, the remote UE or both is indicated. In addition, when the relay UE collects the association information each time, remote UEs for which the SI is requested as well as the quantity of remote UEs are indicated. Furthermore, identification information about each remote UE is recorded.

The association information for the on-demand SI requested in accordance with the request from the remote UE is stored separately in a new entry or a new report.

When the remote UE in the connected state transmits the association information to the network device unsuccessfully, the remote UE notifies the relay UE, so that the relay UE collects, records and reports the association information.

When the remote UE in the idle state/inactive state/connected state transmits the association information to the relay UE unsuccessfully, the remote UE notifies the relay UE, so that the relay UE collects, records and reports the association information.

When the relay UE enters the connected state, one or two pieces of indication information (the first notification message) is transmitted through the uplink complete message, so as to indicate that the association information for the relay UE and the remote UE is stored in the relay UE. When the network device wants to obtain the association information, it transmits one or two requests (the first association information obtaining request), so as to instruct the relay UE to report the association information for the relay UE and/or the remote UE. Upon the receipt of the request, the relay UE reports the stored association information.

In addition, how to collect, by the relay UE and the remote UE, the association information may also be configured by the network device. To be specific, the configuration information from the network device includes the following two pieces of information: first configuration information used to instruct the relay UE to collect the association information generated by the remote UE in all states, and second configuration information used to instruct the remote UE not to collect the association information generated by the remote UE in all states.

Figure 4:
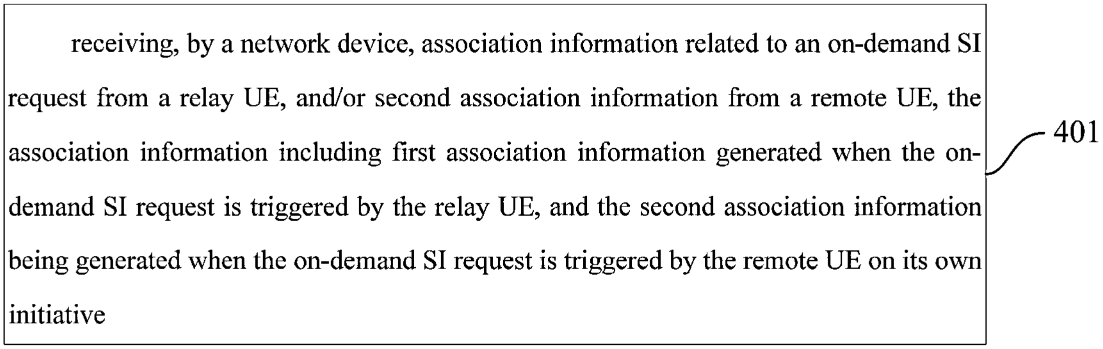
FIG. 4 is yet another flow chart of the information processing method according to one embodiment of the present application.

As shown in FIG. 4, the present application further provides in some embodiments an information collection and processing method performed by a network device, which includes Step 401 of receiving, by the network device, association information related to an on-demand SI request from a relay UE, and/or second association information from a remote UE. The association information includes first association information that is generated when the on-demand SI request is triggered by the relay UE, and the second association information is generated when the on-demand SI request is triggered by the remote UE on its own initiative.

It should be appreciated that, the network device receives the association information related to the on-demand SI request and obtained (collected) by the relay UE and the remote UE mainly in the following three modes.

First mode: each of the remote UE and the relay UE collects respectively the association information corresponding to the on-demand SI request and generated by itself, and transmits the association information to the network device. The network device receives the association information collected by the remote UE and the association information collected by the relay UE respectively.

Second mode: the association information corresponding to the on-demand SI request and generated by the remote UE is divided into two parts. A first part includes the association information collected by the remote UE in the connected state and the association information which fails to be transmitted by the remote UE in the idle state/inactive state/OOC state to the relay UE, and the first part is transmitted by the remote UE to the network device. A second part includes the association information requested by the remote UE in the idle state/inactive state/OOC state to the relay UE, and this part is transmitted by the relay UE to the network device. To be specific, the relay UE collects the association information generated by the relay UE itself as well as the association information generated upon the receipt of the request from the remote UE in the idle state/inactive state/OOC state, and transmits it to the network device.

Third mode: merely the relay UE collects the association information corresponding to the on-demand SI request, and the remote UE does not collect the association information corresponding to the on-demand SI request. In addition, merely the relay UE transmits the association information to the network device.

According to the embodiments of the present application, in a relay scenario, the relay UE and/or the remote UE obtain(s) the association information related to the on-demand SI request, and transmit(s) the association information to the network device for optimization. As a result, it is able to solve the problem in the relay scenario where it is impossible for the network device to accurately obtain the association information related to the on-demand SI request.

In a possible embodiment of the present application, when the network device receives the association information, prior to receiving the association information related to the on-demand SI request from the relay UE, the method further includes receiving a first notification message from the relay UE in the connected state, and the first notification message is used to notify the network device that the association information is stored in the relay UE.

In a possible embodiment of the present application, when the network device receives the second association information, prior to receiving the second association information from the remote UE, the method further includes receiving a second notification message from the remote UE in the connected state, and the second notification message is used to notify the network device that the second association information is stored in the remote UE.

In a possible embodiment of the present application, when the network device receives the association information, prior to receiving the association information related to the on-demand SI request from the relay UE, the method further includes transmitting a first association information obtaining request to the relay UE, and the first association information obtaining request is used to request for the association information stored in the relay UE.

In a possible embodiment of the present application, when the network device receives the second association information, prior to receiving the second association information from the remote UE, the method further includes transmitting a second association information obtaining request to the remote UE, and the second association information obtaining request is used to request for the association information stored in the remote UE.

In a possible embodiment of the present application, when the network device receives the association information, prior to receiving the association information related to the on-demand SI request from the relay UE, the method further includes transmitting first configuration information to the relay UE, and the first configuration information is used to indicate whether the relay UE obtains the association information that is generated when the on-demand SI request is triggered by the remote UE.

In a possible embodiment of the present application, when the network device receives the second association information, prior to receiving the second association information from the remote UE, the method further includes transmitting second configuration information to the remote UE, and the second configuration information is used to indicate whether the remote UE obtains the second association information that is generated when the on-demand SI request is triggered by the remote UE on its own initiative.

It should be appreciated that, the description about the information processing method for the network device may be applied to the information processing methods for the relay UE and the remote UE, with a same technical effect.

Figure 5:
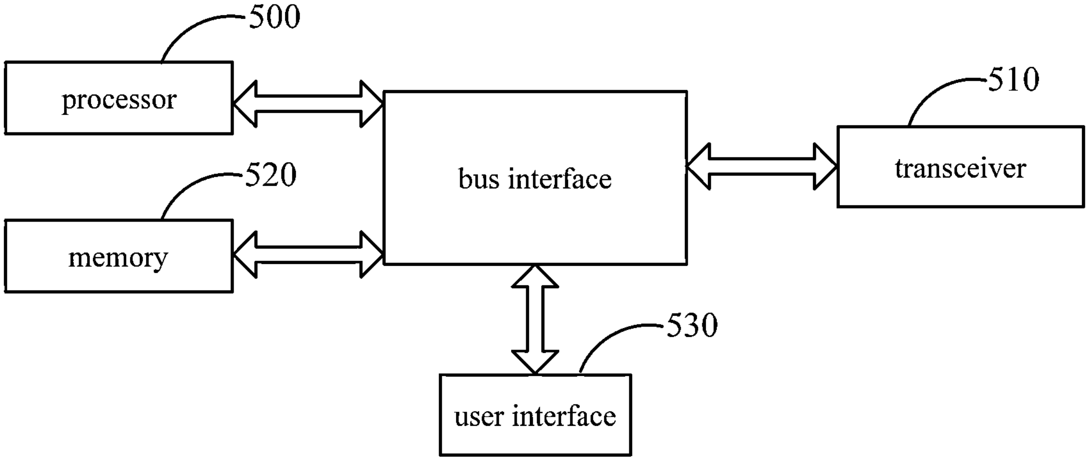
FIG. 5 is a block diagram of an information processing device according to one embodiment of the present application.

As shown in FIG. 5, the present application further provides in some embodiments an information processing device, which includes a memory 520, a transceiver 510 and a processor 500. The memory 520 is configured to store therein a program instruction. The transceiver 510 is configured to receive and transmit data under the control of the processor 500. The processor 500 is configured to read the computer program in the memory 520, so as to obtain association information related to an on-demand SI request, and the association information includes first association information that is generated when the on-demand SI request is triggered by a relay UE. The transceiver 510 is configured to transmit the association information to a network device.

In a possible embodiment of the present application, the first association information includes one or more of: first sub-association information that is generated when the on-demand SI request is voluntarily triggered by the relay UE and on-demand SI is requested successfully; second sub-association information that is generated when the on-demand SI request is voluntarily triggered by the relay UE and the on-demand SI is requested unsuccessfully; third sub-association information that is generated when the relay UE plans to request for, but has not yet requested for, the on-demand SI; fourth sub-association information that is generated when the on-demand SI request is passively triggered by the relay UE and the on-demand SI is requested successfully; fifth sub-association information that is generated when the on-demand SI request is passively triggered by the relay UE and the on-demand SI is requested unsuccessfully; or sixth sub-association information that is generated when the on-demand SI request is passively triggered by the relay UE and the on-demand SI has not yet been requested. The on-demand SI request triggered by the relay UE passively includes an on-demand SI request triggered passively upon the receipt of an SI request message from a remote UE.

In a possible embodiment of the present application, the association information includes one or more of: a type of requested SI; the quantity of requests; a type of a UE requesting for the SI, the type of the UE including a relay UE and/or a remote UE; a quantity of UEs requesting for the SI; or IDs of UEs requesting for the SI.

In a possible embodiment of the present application, after the processor 500 obtains the association information related to the on-demand SI request, the transceiver 510 is further configured to, in the case that the relay UE is in a connected state, transmit a first notification message to the network device, and the first notification message is used to notify the network device that the association information is stored in the relay UE.

In a possible embodiment of the present application, the transceiver 510 is specifically configured to: receive a first association information obtaining request from the network device, the first association information obtaining request being used to request for the association information stored in the relay UE; and transmit the association information satisfying the first association information obtaining request to the network device in accordance with the first association information obtaining request.

In a possible embodiment of the present application, the association information further includes second association information that is generated when the on-demand SI request is voluntarily triggered by a remote UE. When obtaining the association information related to the on-demand SI request, the transceiver 510 is further configured to receive the second association information from the remote UE. The second association information includes one or more of: association information that is generated when the on-demand SI request is triggered by the remote UE in a connected state on its own initiative and the on-demand SI request is requested successfully; association information that is generated when the on-demand SI request is triggered by the remote UE in the connected state on its own initiative and the on-demand SI request is requested unsuccessfully; association information that is generated when the remote UE in the connected state plans to request for, but has not yet requested for, the on-demand SI; association information that is generated when the remote UE in a non-connected state transmits a request to the relay UE unsuccessfully; association information that is generated when the remote UE in the non-connected state transmits a request to the relay UE successfully; or association information that is generated when the remote UE in the non-connected state plans to request for, but has not yet requested for, the on-demand SI.

In a possible embodiment of the present application, when obtaining the association information related to the on-demand SI request, the transceiver 510 is specifically configured to receive first configuration information from the network device, the first configuration information being used to indicate whether the relay UE is to obtain the association information related to the on-demand SI request triggered by a remote UE; in the case that the first configuration information indicates that the relay UE is to obtain the association information related to the on-demand SI request triggered by the remote UE, the transceiver 510 is specifically configured to receive second association information from the remote UE, the second association information being association information that is generated when the on-demand SI request is triggered by the remote UE on its own initiative; and/or the processor 500 is configured to determine the on-demand SI request triggered passively upon the receipt of an SI request message from the remote UE, and obtain one or more of fourth sub-association information, fifth sub-association information or sixth sub-association information that is generated when the on-demand SI request is triggered passively.

In a possible embodiment of the present application, the processor 500 is specifically configured to obtain, in accordance with a designated UE state in first configuration information from the network device, the association information related to the on-demand SI request and generated in the designated UE state, and the designated UE state includes one or more of a connected state, an idle state or an inactive state.

In FIG. 5, bus architecture may include a number of buses and bridges connected to each other, so as to connect various circuits for one or more processors 500 and one or more memories 520. In addition, as is known in the art, the bus architecture may be used to connect any other circuits, such as a circuit for a peripheral device, a circuit for a voltage stabilizer and a power management circuit. A bus interface may be provided, and the transceiver 510 may consist of a plurality of elements, i.e., a transmitter and a receiver for communication with any other devices over a transmission medium. The transmission medium includes a wireless channel, a wired channel, or an optical cable. With respect to different UEs, a user interface 530 may also be provided for devices which are to be arranged inside or outside the UE, and these devices may include but not limited to a keypad, a display, a speaker, a microphone and a joystick.

The processor 500 may take charge of managing the bus architecture as well as general processings. The memory 520 may store therein data for the operation of the processor 500.

In a possible embodiment of the present application, the processor 500 is a Central Processing Unit (CPU), an Application Specific Integrated Circuit (ASIC), a Field-Programmable Gate Array (FPGA) or a Complex Programmable Logic Device (CPLD). The processor 500 may also use multi-core architecture.

The processor 500 is configured to call the computer program in the memory, so as to implement the above-mentioned method in accordance with obtained executable instructions. The processor 500 may also be physically separated from the memory 520.

According to the information processing device in the embodiments of the present application, in a relay scenario, the relay UE accurately obtains the first association information related to the on-demand SI request, and transmits it to the network device for optimization.

It should be appreciated that, the information processing device in the embodiments of the present application is used to implement the above-mentioned method with a same technical effect, which will not be particularly defined herein.

Figure 6:
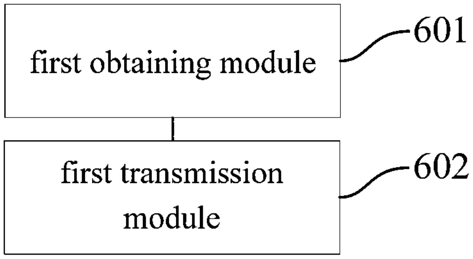
FIG. 6 is a schematic view showing the information processing device according to one embodiment of the present application.

As shown in FIG. 6, the present application further provides in some embodiments an information processing device, which includes: a first obtaining module 601 configured to obtain association information related to an on-demand SI request, the association information including first association information that is generated when the on-demand SI request is triggered by a relay UE; and a first transmission module 602 configured to transmit the association information to a network device.

According to the information processing device in the embodiments of the present application, in a relay scenario, the relay UE accurately obtains the first association information related to the on-demand SI request, and transmits it to the network device for optimization.

In a possible embodiment of the present application, the first association information includes one or more of: first sub-association information that is generated when the on-demand SI request is voluntarily triggered by the relay UE and on-demand SI is requested successfully; second sub-association information that is generated when the on-demand SI request is voluntarily triggered by the relay UE and the on-demand SI is requested unsuccessfully; third sub-association information that is generated when the relay UE plans to request for, but has not yet requested for, the on-demand SI; fourth sub-association information that is generated when the on-demand SI request is passively triggered by the relay UE and the on-demand SI is requested successfully; fifth sub-association information that is generated when the on-demand SI request is passively triggered by the relay UE and the on-demand SI is requested unsuccessfully; or sixth sub-association information that is generated when the on-demand SI request is passively triggered by the relay UE and the on-demand SI has not yet been requested. The on-demand SI request triggered by the relay UE passively includes an on-demand SI request triggered passively upon the receipt of an SI request message from a remote UE.

In a possible embodiment of the present application, the association information includes one or more of: a type of requested SI; the quantity of requests; a type of a UE requesting for the SI, the type of the UE including a relay UE and/or a remote UE; a quantity of UEs requesting for the SI; or IDs of UEs requesting for the SI.

In a possible embodiment of the present application, the information processing device further includes a first notification message transmission module configured to, in the case that the relay UE is in a connected state, transmit a first notification message to the network device, and the first notification message is used to notify the network device that the association information is stored in the relay UE.

In a possible embodiment of the present application, the first transmission module includes: a first obtaining request reception unit configured to receive a first association information obtaining request from the network device, the first association information obtaining request being used to request for the association information stored in the relay UE; and a first association information transmission unit configured to transmit the association information satisfying the first association information obtaining request to the network device in accordance with the first association information obtaining request.

In a possible embodiment of the present application, the association information further includes second association information that is generated when the on-demand SI request is voluntarily triggered by a remote UE. The first reception module 601 includes an association information reception unit configured to receive the second association information from the remote UE. The second association information includes one or more of: association information that is generated when the on-demand SI request is triggered by the remote UE in a connected state on its own initiative and the on-demand SI request is requested successfully; association information that is generated when the on-demand SI request is triggered by the remote UE in the connected state on its own initiative and the on-demand SI request is requested unsuccessfully; association information that is generated when the remote UE in the connected state plans to request for, but has not yet requested for, the on-demand SI; association information that is generated when the remote UE in a non-connected state transmits a request to the relay UE unsuccessfully; association information that is generated when the remote UE in the non-connected state transmits a request to the relay UE successfully; or association information that is generated when the remote UE in the non-connected state plans to request for, but has not yet requested for, the on-demand SI.

In a possible embodiment of the present application, the first obtaining module 601 includes: a first configuration information reception unit configured to receive first configuration information from the network device, the first configuration information being used to indicate whether the relay UE is to obtain the association information related to the on-demand SI request triggered by a remote UE; and a first reception unit configured to, in the case that the first configuration information indicates that the relay UE is to obtain the association information related to the on-demand SI request triggered by the remote UE, receive second association information from the remote UE, the second association information being association information that is generated when the on-demand SI request is triggered by the remote UE on its own initiative, and/or determine the on-demand SI request triggered passively upon the receipt of an SI request message from the remote UE, and obtain one or more of fourth sub-association information, fifth sub-association information or sixth sub-association information that is generated when the on-demand SI request is triggered passively.

In a possible embodiment of the present application, the first obtaining module 601 includes a first association information obtaining unit configured to, in accordance with a designated UE state in first configuration information from the network device, the association information related to the on-demand SI request and generated in the designated UE state. The designated UE state includes one or more of a connected state, an idle state or an inactive state.

According to the information processing device in the embodiments of the present application, in a relay scenario, it is able for the relay UE to accurately obtain the first association information related to the on-demand SI request, and transmit it to the network device for optimization.

It should be appreciated that, the units in the embodiments of the present application are for illustrative purposes, and they are provided merely on the basis of their logic functions. The units may be integrated in a processing unit, or physically separated from each other, or two or more units may be integrated in one unit. The integrated units may be implemented in the form of hardware or a software functional unit.

In the case that the functional units are implemented in a software form and sold or used as a separate product, they may be stored in a computer-readable medium. Based on this, the technical solutions of the present application, partial or full, or parts of the technical solutions of the present application contributing to the related art, may appear in the form of software products, which may be stored in a storage medium and include several instructions so as to enable computer equipment (a personal computer, a server or network equipment) to execute all or parts of the steps of the method according to the embodiments of the present application. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, the information processing device in the embodiments of the present application is used to implement the above-mentioned method with a same technical effect, which will not be particularly defined herein.

The present application further provides in some embodiments a processor-readable storage medium storing therein a program instruction. The program instruction is executed by a processor, so as to: obtain association information related to an on-demand SI request, the association information including first association information that is generated when the on-demand SI request is triggered by a relay UE; and transmit the association information to a network device.

In a possible embodiment of the present application, the first association information includes one or more of: first sub-association information that is generated when the on-demand SI request is voluntarily triggered by the relay UE and on-demand SI is requested successfully; second sub-association information that is generated when the on-demand SI request is voluntarily triggered by the relay UE and the on-demand SI is requested unsuccessfully; third sub-association information that is generated when the relay UE plans to request for, but has not yet requested for, the on-demand SI; fourth sub-association information that is generated when the on-demand SI request is passively triggered by the relay UE and the on-demand SI is requested successfully; fifth sub-association information that is generated when the on-demand SI request is passively triggered by the relay UE and the on-demand SI is requested unsuccessfully; or sixth sub-association information that is generated when the on-demand SI request is passively triggered by the relay UE and the on-demand SI has not yet been requested. The on-demand SI request triggered by the relay UE passively includes an on-demand SI request triggered passively upon the receipt of an SI request message from a remote UE.

In a possible embodiment of the present application, the association information includes one or more of: a type of requested SI; the quantity of requests; a type of a UE requesting for the SI, the type of the UE including a relay UE and/or a remote UE; a quantity of UEs requesting for the SI; or IDs of UEs requesting for the SI.

In a possible embodiment of the present application, the processor is further configured to, in the case that the relay UE is in a connected state, transmit a first notification message to the network device, and the first notification message is used to notify the network device that the association information is stored in the relay UE.

In a possible embodiment of the present application, the processor is further configured to: receive a first association information obtaining request from the network device, the first association information obtaining request being used to request for the association information stored in the relay UE; and transmit the association information satisfying the first association information obtaining request to the network device in accordance with the first association information obtaining request.

In a possible embodiment of the present application, the association information further includes second association information that is generated when the on-demand SI request is voluntarily triggered by a remote UE. The processor is specifically configured to receive the second association information from the remote UE. The second association information includes one or more of: association information that is generated when the on-demand SI request is triggered by the remote UE in a connected state on its own initiative and the on-demand SI request is requested successfully; association information that is generated when the on-demand SI request is triggered by the remote UE in the connected state on its own initiative and the on-demand SI request is requested unsuccessfully; association information that is generated when the remote UE in the connected state plans to request for, but has not yet requested for, the on-demand SI; association information that is generated when the remote UE in a non-connected state transmits a request to the relay UE unsuccessfully; association information that is generated when the remote UE in the non-connected state transmits a request to the relay UE successfully; or association information that is generated when the remote UE in the non-connected state plans to request for, but has not yet requested for, the on-demand SI.

In a possible embodiment of the present application, the processor is specifically configured to: a first configuration information reception unit configured to receive first configuration information from the network device, the first configuration information being used to indicate whether the relay UE is to obtain the association information related to the on-demand SI request triggered by a remote UE; in the case that the first configuration information indicates that the relay UE is to obtain the association information related to the on-demand SI request triggered by the remote UE, receive second association information from the remote UE, the second association information being association information that is generated when the on-demand SI request is triggered by the remote UE on its own initiative; and/or determine the on-demand SI request triggered passively upon the receipt of an SI request message from the remote UE, and obtain one or more of fourth sub-association information, fifth sub-association information or sixth sub-association information that is generated when the on-demand SI request is triggered passively.

In a possible embodiment of the present application, the processor is specifically configured to, in accordance with a designated UE state in first configuration information from the network device, the association information related to the on-demand SI request and generated in the designated UE state. The designated UE state includes one or more of a connected state, an idle state or an inactive state.

The program instruction is executed by the processor so as to implement the above-mentioned method for the relay UE in FIG. 2, which will not be particularly defined herein.

Figure 7:
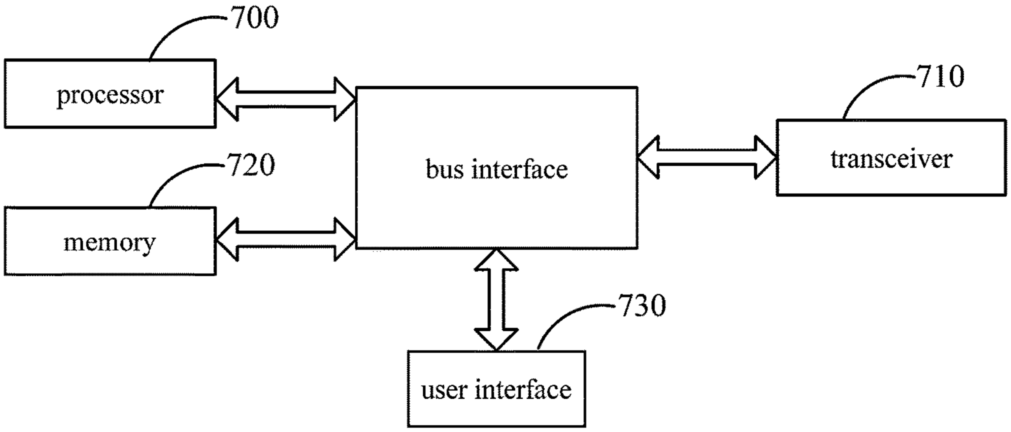
FIG. 7 is another block diagram of the information processing device according to one embodiment of the present application.

As shown in FIG. 7, the present application further provides in some embodiments an information processing device, which includes a memory 720, a transceiver 710 and a processor 700. The memory 720 is configured to store therein a program instruction. The transceiver 710 is configured to receive and transmit data under the control of the processor 700. The processor 700 is configured to read the program instruction in the memory 720, so as to obtain second association information that is generated when an on-demand SI request is triggered by a remote UE on its own initiative. The transceiver 710 is configured to transmit the second association information to a network device or a relay UE.

In a possible embodiment of the present application, the second association information includes one or more of: association information that is generated when the on-demand SI request is triggered by the remote UE in a connected state on its own initiative and on-demand SI is requested successfully; association information that is generated when the on-demand SI request is triggered by the remote UE in the connected state on its own initiative and the on-demand SI is requested unsuccessfully; association information that is generated when the remote UE in the connected state plans to request for, but has not yet requested for, the on-demand SI; association information that is generated when the remote UE in a non-connected state transmits a request to the relay UE unsuccessfully; association information that is generated when the remote UE in the non-connected state transmits a request to the relay UE successfully; or association information that is generated when the remote UE in the non-connected state plans to request for, but has not yet requested for, the on-demand SI.

In a possible embodiment of the present application, after the processor 700 has obtained the second association information that is generated when the on-demand SI request is triggered by the remote UE on its own initiative, the transceiver 710 is further configured to, in the case that the remote UE is in a connected state, transmit a second notification message to the network device, and the second notification message is used to notify the network device that the second association information is stored in the remote UE.

In a possible embodiment of the present application, the transceiver 710 is specifically configured to: receive a second association information obtaining request from the network device, the second association information obtaining request being used to request association information stored in the remote UE; and transmit the association information satisfying the second association information obtaining request to the network device in accordance with the second association information obtaining request.

In a possible embodiment of the present application, the transceiver 710 is specifically configured to receive second configuration information from the network device, and the second configuration information is used to indicate whether the remote UE obtains the second association information that is generated when the on-demand SI request is triggered by the remote UE on its own initiative.

In a possible embodiment of the present application, the processor 700 is specifically configured to obtain, in accordance with a designated UE state in the second configuration information from the network device, the association information related to the on-demand SI request and generated in the designated UE state, and the designated UE state includes one or more of a connected state, an idle state or an inactive state.

In FIG. 7, bus architecture may include a number of buses and bridges connected to each other, so as to connect various circuits for one or more processors 700 and one or more memories 720. In addition, as is known in the art, the bus architecture may be used to connect any other circuits, such as a circuit for a peripheral device, a circuit for a voltage stabilizer and a power management circuit. A bus interface may be provided, and the transceiver 710 may consist of a plurality of elements, i.e., a transmitter and a receiver for communication with any other devices over a transmission medium. The transmission medium includes a wireless channel, a wired channel, or an optical cable. With respect to different UEs, a user interface 730 may also be provided for devices which are to be arranged inside or outside the UE, and these devices may include but not limited to a keypad, a display, a speaker, a microphone and a joystick.

The processor 700 may take charge of managing the bus architecture as well as general processings. The memory 720 may store therein data for the operation of the processor 700.

In a possible embodiment of the present application, the processor 700 is a CPU, an ASIC, an FPGA or a CPLD. The processor 700 may also use multi-core architecture.

The processor 700 is configured to call the computer program in the memory, so as to implement the above-mentioned method in accordance with obtained executable instructions. The processor 700 may also be physically separated from the memory 720.

According to the information processing device in the embodiments of the present application, in a relay scenario, it is able for the remote UE to accurately obtain the second association information related to the on-demand SI request, and transmit it to the network device for optimization.

It should be appreciated that, the information processing device in the embodiments of the present application is used to implement the above-mentioned method with a same technical effect, which will not be particularly defined herein.

Figure 8:
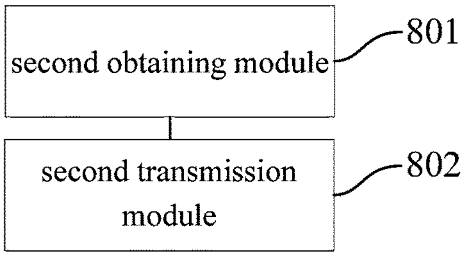
FIG. 8 is another schematic view showing the information processing device according to one embodiment of the present application.

As shown in FIG. 8, the present application further provides in some embodiments an information processing device, which includes: a second obtaining module 801 configured to obtain second association information that is generated when an on-demand SI request is triggered by a remote UE on its own initiative; and a second transmission module 802 configured to transmit the second association information to a network device or a relay UE.

According to the information processing device in the embodiments of the present application, in a relay scenario, it is able for the remote UE to accurately obtain the second association information related to the on-demand SI request, and directly transmit it to the network device or transmit it to the network device through the relay UE for optimization.

In a possible embodiment of the present application, the second association information includes one or more of: association information that is generated when the on-demand SI request is triggered by the remote UE in a connected state on its own initiative and on-demand SI is requested successfully; association information that is generated when the on-demand SI request is triggered by the remote UE in the connected state on its own initiative and the on-demand SI is requested unsuccessfully; association information that is generated when the remote UE in the connected state plans to request for, but has not yet requested for, the on-demand SI; association information that is generated when the remote UE in a non-connected state transmits a request to the relay UE unsuccessfully; association information that is generated when the remote UE in the non-connected state transmits a request to the relay UE successfully; or association information that is generated when the remote UE in the non-connected state plans to request for, but has not yet requested for, the on-demand SI.

In a possible embodiment of the present application, the information processing device further includes a second notification message transmission module configured to, in the case that the remote UE is in a connected state, transmit a second notification message to the network device, and the second notification message is used to notify the network device that the second association information is stored in the remote UE.

In a possible embodiment of the present application, the second transmission module 802 includes: a second obtaining request reception unit configured to receive a second association information obtaining request from the network device, the second association information obtaining request being used to request association information stored in the remote UE; and a second association information transmission unit configured to transmit the association information satisfying the second association information obtaining request to the network device in accordance with the second association information obtaining request.

In a possible embodiment of the present application, the second obtaining module 801 includes a configuration information reception unit configured to receive second configuration information from the network device, and the second configuration information is used to indicate whether the remote UE obtains the second association information that is generated when the on-demand SI request is triggered by the remote UE on its own initiative.

In a possible embodiment of the present application, the second obtaining module 801 includes a second association information obtaining unit configured to obtain, in accordance with a designated UE state in the second configuration information from the network device, the association information related to the on-demand SI request and generated in the designated UE state, and the designated UE state includes one or more of a connected state, an idle state or an inactive state.

According to the information processing device in the embodiments of the present application, in a relay scenario, it is able for the remote UE to accurately obtain the second association information related to the on-demand SI request, and directly transmit it to the network device or transmit it to the network device through the relay UE for optimization.

It should be appreciated that, the units in the embodiments of the present application are for illustrative purposes, and they are provided merely on the basis of their logic functions. The units may be integrated in a processing unit, or physically separated from each other, or two or more units may be integrated in one unit. The integrated units may be implemented in the form of hardware or a software functional unit.

In the case that the functional units are implemented in a software form and sold or used as a separate product, they may be stored in a computer-readable medium. Based on this, the technical solutions of the present application, partial or full, or parts of the technical solutions of the present application contributing to the related art, may appear in the form of software products, which may be stored in a storage medium and include several instructions so as to enable computer equipment (a personal computer, a server or network equipment) to execute all or parts of the steps of the method according to the embodiments of the present application. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, the information processing device in the embodiments of the present application is used to implement the above-mentioned method with a same technical effect, which will not be particularly defined herein.

The present application further provides in some embodiments a processor-readable storage medium storing therein a program instruction. The program instruction is executed by a processor, so as to: obtain second association information that is generated when an on-demand SI request is triggered by a remote UE on its own initiative; and transmit the second association information to a network device or a relay UE.

In a possible embodiment of the present application, the second association information includes one or more of: association information that is generated when the on-demand SI request is triggered by the remote UE in a connected state on its own initiative and on-demand SI is requested successfully; association information that is generated when the on-demand SI request is triggered by the remote UE in the connected state on its own initiative and the on-demand SI is requested unsuccessfully; association information that is generated when the remote UE in the connected state plans to request for, but has not yet requested for, the on-demand SI; association information that is generated when the remote UE in a non-connected state transmits a request to the relay UE unsuccessfully; association information that is generated when the remote UE in the non-connected state transmits a request to the relay UE successfully; or association information that is generated when the remote UE in the non-connected state plans to request for, but has not yet requested for, the on-demand SI.

In a possible embodiment of the present application, subsequent to obtaining the second association information that is generated when the on-demand SI request is triggered by the remote UE on its own initiative, the processor is further configured to, in the case that the remote UE is in a connected state, transmit a second notification message to the network device, and the second notification message is used to notify the network device that the second association information is stored in the remote UE.

In a possible embodiment of the present application, the processor is specifically configured to: receive a second association information obtaining request from the network device, the second association information obtaining request being used to request association information stored in the remote UE; and transmit the association information satisfying the second association information obtaining request to the network device in accordance with the second association information obtaining request.

In a possible embodiment of the present application, the processor is specifically configured to receive second configuration information from the network device, and the second configuration information is used to indicate whether the remote UE obtains the second association information that is generated when the on-demand SI request is triggered by the remote UE on its own initiative.

In a possible embodiment of the present application, the processor is specifically configured to obtain, in accordance with a designated UE state in the second configuration information from the network device, the association information related to the on-demand SI request and generated in the designated UE state, and the designated UE state includes one or more of a connected state, an idle state or an inactive state.

The program instruction is executed by the processor so as to implement the above-mentioned method for the remote UE in FIG. 3, which will not be particularly defined herein.

Figure 9:
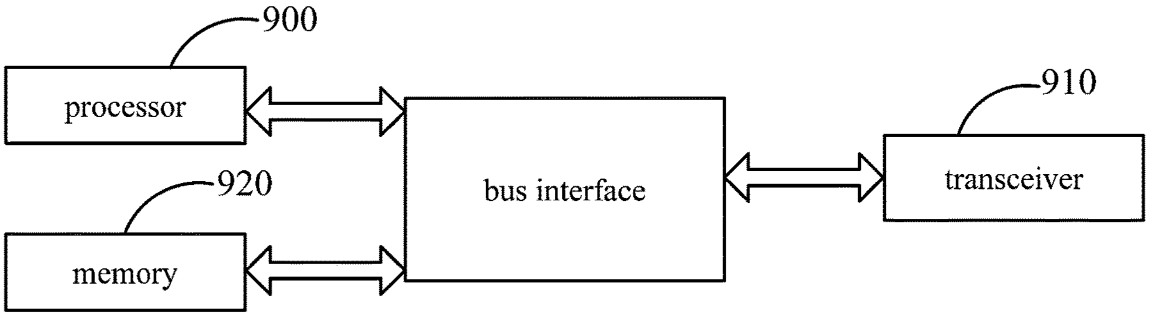
FIG. 9 is yet another block diagram of the information processing device according to one embodiment of the present application.

As shown in FIG. 9, the present application further provides in some embodiments an information processing device, which includes a memory 920, a transceiver 910 and a processor 900. The memory 920 is configured to store therein a program instruction. The transceiver 910 is configured to receive and transmit data under the control of the processor 900. The processor 900 is configured to read the program instruction in the memory 920. The transceiver 910 is configured to receive association information related to an on-demand SI request from a relay UE, and/or second association information from a remote UE. The association information includes first association information that is generated when the on-demand SI request is triggered by the relay UE, and the second association information is generated when the on-demand SI request is triggered by the remote UE on its own initiative.

In a possible embodiment of the present application, when the transceiver 910 receives the association information, prior to receiving the association information related to the on-demand SI request from the relay UE, the transceiver 910 is further configured to receive a first notification message from the relay UE in the connected state, and the first notification message is used to notify the network device that the association information is stored in the relay UE.

In a possible embodiment of the present application, when the transceiver 910 receives the second association information, prior to receiving the second association information from the remote UE, the transceiver 910 is further configured to receive a second notification message from the remote UE in the connected state, and the second notification message is used to notify the network device that the second association information is stored in the remote UE.

In a possible embodiment of the present application, when the transceiver 910 receives the association information, prior to receiving the association information related to the on-demand SI request from the relay UE, the transceiver 910 is further configured to transmit a first association information obtaining request to the relay UE, and the first association information obtaining request is used to request for the association information stored in the relay UE.

In a possible embodiment of the present application, when the transceiver 910 receives the second association information, prior to receiving the second association information from the remote UE, the transceiver 910 is further configured to transmit a second association information obtaining request to the remote UE, and the second association information obtaining request is used to request for the association information stored in the remote UE.

In a possible embodiment of the present application, when the transceiver 910 receives the association information, prior to receiving the association information related to the on-demand SI request from the relay UE, the transceiver 910 is further configured to transmit first configuration information to the relay UE, and the first configuration information is used to indicate whether the relay UE obtains the association information that is generated when the on-demand SI request is triggered by the remote UE.

In a possible embodiment of the present application, when the transceiver 910 receives the second association information, prior to receiving the second association information from the remote UE, the transceiver 910 is further configured to transmit second configuration information to the remote UE, and the second configuration information is used to indicate whether the remote UE obtains the second association information that is generated when the on-demand SI request is triggered by the remote UE on its own initiative.

In FIG. 9, bus architecture may include a number of buses and bridges connected to each other, so as to connect various circuits for one or more processors 900 and one or more memories 920. In addition, as is known in the art, the bus architecture may be used to connect any other circuits, such as a circuit for a peripheral device, a circuit for a voltage stabilizer and a power management circuit. A bus interface may be provided, and the transceiver 910 may consist of a plurality of elements, i.e., a transmitter and a receiver for communication with any other devices over a transmission medium. The transmission medium includes a wireless channel, a wired channel, or an optical cable. The processor 900 may take charge of managing the bus architecture as well as general processings. The memory 920 may store therein data for the operation of the processor 900.

The processor 900 may take charge of managing the bus architecture as well as general processings. The memory 920 may store therein data for the operation of the processor 900.

In a possible embodiment of the present application, the processor 900 is a CPU, an ASIC, an FPGA or a CPLD. The processor 900 may also use multi-core architecture.

The processor 900 is configured to call the computer program in the memory, so as to implement the above-mentioned method in accordance with obtained executable instructions. The processor 900 may also be physically separated from the memory 920.

According to the information processing device in the embodiments of the present application, in a relay scenario, the relay UE and/or the remote UE obtain the association information related to the on-demand SI request, and transmit the association information to the network device for optimization. As a result, it is able to solve the problem in the relay scenario where it is impossible for the network device to accurately obtain the association information related to the on-demand SI request.

It should be appreciated that, the information processing device in the embodiments of the present application is used to implement the above-mentioned method with a same technical effect, which will not be particularly defined herein.

Figure 10:
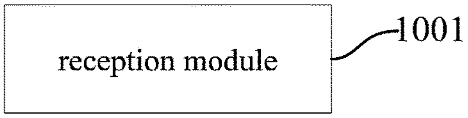
FIG. 10 is yet another schematic view showing the information processing device according to one embodiment of the present application.

As shown in FIG. 10, the present application further provides in some embodiments an information processing device which includes a reception module 1001 configured to receive association information related to an on-demand SI request from a relay UE, and/or second association information from a remote UE. The association information includes first association information that is generated when the on-demand SI request is triggered by the relay UE, and the second association information is generated when the on-demand SI request is triggered by the remote UE on its own initiative.

According to the information processing device in the embodiments of the present application, in a relay scenario, the relay UE and/or the remote UE obtain the association information related to the on-demand SI request, and transmit the association information to the network device for optimization. As a result, it is able to solve the problem in the relay scenario where it is impossible for the network device to accurately obtain the association information related to the on-demand SI request.

In a possible embodiment of the present application, the information processing device further includes a first notification message reception module configured to receive a first notification message from the relay UE in the connected state, and the first notification message is used to notify the network device that the association information is stored in the relay UE.

In a possible embodiment of the present application, the information processing device further includes a second notification message reception module configured to receive a second notification message from the remote UE in the connected state, and the second notification message is used to notify the network device that the second association information is stored in the remote UE.

In a possible embodiment of the present application, the information processing device further includes a first obtaining request transmission module configured to transmit a first association information obtaining request to the relay UE, and the first association information obtaining request is used to request for the association information stored in the relay UE.

In a possible embodiment of the present application, the information processing device further includes a second obtaining request transmission module configured to transmit a second association information obtaining request to the remote UE, and the second association information obtaining request is used to request for the association information stored in the remote UE.

In a possible embodiment of the present application, the information processing device further includes a first configuration information transmission module configured to transmit first configuration information to the relay UE, and the first configuration information is used to indicate whether the relay UE obtains the association information that is generated when the on-demand SI request is triggered by the remote UE.

In a possible embodiment of the present application, the information processing device further includes a second configuration information transmission module configured to transmit second configuration information to the remote UE, and the second configuration information is used to indicate whether the remote UE obtains the second association information that is generated when the on-demand SI request is triggered by the remote UE on its own initiative.

According to the information processing device in the embodiments of the present application, in a relay scenario, the relay UE and/or the remote UE obtain the association information related to the on-demand SI request, and transmit the association information to the network device for optimization. As a result, it is able to solve the problem in the relay scenario where it is impossible for the network device to accurately obtain the association information related to the on-demand SI request.

It should be appreciated that, the units in the embodiments of the present application are for illustrative purposes, and they are provided merely on the basis of their logic functions. The units may be integrated in a processing unit, or physically separated from each other, or two or more units may be integrated in one unit. The integrated units may be implemented in the form of hardware or a software functional unit.

In the case that the functional units are implemented in a software form and sold or used as a separate product, they may be stored in a computer-readable medium. Based on this, the technical solutions of the present application, partial or full, or parts of the technical solutions of the present application contributing to the related art, may appear in the form of software products, which may be stored in a storage medium and include several instructions so as to enable computer equipment (a personal computer, a server or network equipment) to execute all or parts of the steps of the method according to the embodiments of the present application. The storage medium includes any medium capable of storing therein program codes, e.g., a USB flash disk, a mobile HD, an ROM, an RAM, a magnetic disk or an optical disk.

It should be appreciated that, the information transmission apparatus in the embodiments of the present application is used to implement the above-mentioned method with a same technical effect, which will not be particularly defined herein.

The present application further provides in some embodiments a processor-readable storage medium storing therein a program instruction. The program instruction is executed by a processor so as to receive association information related to an on-demand SI request from a relay UE, and/or second association information from a remote UE. The association information includes first association information that is generated when the on-demand SI request is triggered by the relay UE, and the second association information is generated when the on-demand SI request is triggered by the remote UE on its own initiative.

In a possible embodiment of the present application, the transceiver is further configured to receive a first notification message from the relay UE in the connected state, and the first notification message is used to notify the network device that the association information is stored in the relay UE.

In a possible embodiment of the present application, the transceiver is further configured to receive a second notification message from the remote UE in the connected state, and the second notification message is used to notify the network device that the second association information is stored in the remote UE.

In a possible embodiment of the present application, the transceiver is further configured to transmit a first association information obtaining request to the relay UE, and the first association information obtaining request is used to request for the association information stored in the relay UE.

In a possible embodiment of the present application, the transceiver is further configured to transmit a second association information obtaining request to the remote UE, and the second association information obtaining request is used to request for the association information stored in the remote UE In a possible embodiment of the present application, the transceiver is further configured to transmit first configuration information to the relay UE, and the first configuration information is used to indicate whether the relay UE obtains the association information that is generated when the on-demand SI request is triggered by the remote UE.

In a possible embodiment of the present application, the transceiver is further configured to transmit second configuration information to the remote UE, and the second configuration information is used to indicate whether the remote UE obtains the second association information that is generated when the on-demand SI request is triggered by the remote UE on its own initiative.

The program instruction is executed by the processor so as to implement the above-mentioned method for the network device in FIG. 4, which will not be particularly defined herein.

Schemes in the embodiments of the present application may be applied to various systems, especially a 5G system, e.g., Global System of Mobile communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplexing (FDD) system, LTE Time Division Duplexing (TDD) system, Long Term Evolution Advanced (LTE-A) system, Universal Mobile Telecommunication System (UMTS), Worldwide Interoperability for Microwave Access (WiMAX) system, or 5th-Generation (5G) New Radio (NR) system. Each of these systems includes a terminal device and a network device. Each system further includes a core network part, e.g., an Evolved Packet System (EPS) or 5G system (5GS).

The terminal involved in the embodiments of the present application is a device for providing voice data and/or any other service data to a user, e.g., a handheld device having a wireless connection function, or any other processing device capable of being connected to a wireless modem. In different systems, the terminal device may have different names. For example, in a 5G system, the terminal device is called as User Equipment (UE). A wireless terminal device communicates with one or more Core Networks (CNs) via a Radio Access Network (RAN). The wireless terminal device may be a mobile terminal, e.g., a mobile phone (or cellular phone), or a computer having the mobile terminal device, e.g., a portable, pocket-sized, handheld, built-in or vehicle-mounted mobile device, which are capable of exchanging voice and/or data with the RAN. For example, the wireless terminal device may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal device may also be called as system, subscriber unit, subscriber station, mobile station, mobile, remote station, remote terminal, access terminal, user terminal, user agent or user device, which will not be particularly defined herein.

The network device involved in the embodiments of the present application may be a base station which includes a plurality of cells providing services for the terminal. Depending on different application scenarios, the base station is called as an access point, a device in an access network in communication with the wireless terminal device through one or more sectors on an air interface, or any other name. The network device is used to exchange a received air frame with an Internet Protocol (IP) packet, and it serves as a router between the wireless terminal device and the other part of the access network. The other part of the access network includes an IP communication network. The network device may further coordinate attribute management on the air interface. For example, the network device involved in the embodiments of the present application is a Base Transceiver Station (BTS) in the GSM or CDMA system, a NodeB in the WCDMA system, an evolutional Node B (eNB, or e-NodeB) in the LTE system, a 5G base station (gNB) in 5G network architecture (next generation system), a Home evolved Node B (HeNB), a relay node, a femto, or a pico, which will not be particularly defined herein. In some network structures, the network device includes a Centralized Unit (CU) and a Distributed Unit (DU), which may be geographically separated from each other.

Multi Input Multi Output (MIMO) transmission is performed between the network device and the terminal each with one or more antennae, and the MIMO transmission is Single User MIMO (SU-MIMO) or Multiple User MIMO (MU-MIMO). Depending on the form of an antenna combination and the quantity of antennae, the MIMO transmission may be 2D-MIMO, 3D-MIMO, FD-MIMO or massive-MIMO, and it may also be diversity transmission, precoding transmission or beam-forming transmission.

It should be appreciated that, the present application may be provided as a method, a system or a computer program product, so the present application may be in the form of full hardware embodiments, full software embodiments, or combinations thereof. In addition, the present application may be in the form of a computer program product implemented on one or more computer-readable storage mediums (including but not limited to disk memory and optical memory) including computer-readable program codes.

The present application has been described with reference to the flow charts and/or block diagrams of the method, device (system) and computer program product according to the embodiments of the present application. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, the determination module may be processing elements arranged separately, or integrated into a chip of the above-mentioned device. In addition, the module may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules, units, sub-units or sub-modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present application intend to provide non-exclusive coverage, so that a procedure, method, system, product or device including a series of steps or units may also include any other elements not listed herein, or may include any inherent steps or units of the procedure, method, system, product or device. The expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, there are both A and C, and there are A, B and C. Similarly, the phrase "at least one of A or B" in the specification and the appended claims shall be understood as "there is only A, there is only B, or there are both A and B".

The above embodiments are for illustrative purposes only, but the present application is not limited thereto. Obviously, a person skilled in the art may make further modifications and improvements without departing from the spirit of the present application, and these modifications and improvements shall also fall within the scope of the present application.

What is claimed is:

1. An information processing method performed by a relay User Equipment (UE), the information processing method comprising:

obtaining, by the relay UE, association information related to an on-demand System Information (SI) request, the association information comprising first association information that is generated when the on-demand SI request is triggered by the relay UE; and transmitting, by the relay UE, the association information to a network device, wherein the first association information comprises one or more of:

first sub-association information that is generated when the on-demand SI request is voluntarily triggered by the relay UE and on-demand SI is requested successfully;

second sub-association information that is generated when the on-demand SI request is voluntarily triggered by the relay UE and the on-demand SI is requested unsuccessfully;

third sub-association information that is generated when the relay UE plans to request for, but has not yet requested for, the on-demand SI;

fourth sub-association information that is generated when the on-demand SI request is passively triggered by the relay UE and the on-demand SI is requested successfully;

fifth sub-association information that is generated when the on-demand SI request is passively triggered by the relay UE and the on-demand SI is requested unsuccessfully; or sixth sub-association information that is generated when the on-demand SI request is passively triggered by the relay UE and the on-demand SI has not yet been requested, wherein the on-demand SI request triggered by the relay UE passively comprises an on-demand SI request triggered passively upon the receipt of an SI request message from a remote UE.

2. The information processing method according to claim 1, wherein the association information comprises one or more of:

a type of requested SI;

the quantity of requests;

a type of a UE requesting for the SI, the type of the UE comprising at least one of a relay UE or a remote UE;

a quantity of UEs requesting for the SI; or

Identities (IDs) of UEs requesting for the SI.

3. The information processing method according to claim 1, wherein subsequent to obtaining the association information related to the on-demand SI request, the information processing method further comprises: transmitting a first notification message to the network device when the relay UE is in a connected state, and the first notification message is used to notify the network device that the association information is stored in the relay UE.

4. The information processing method according to claim 1, wherein the transmitting, by the relay UE, the association information to the network device comprises:

receiving a first association information obtaining request from the network device, the first association information obtaining request being used to request for the association information stored in the relay UE; and transmitting the association information satisfying the first association information obtaining request to the network device in accordance with the first association information obtaining request.

5. The information processing method according to claim 1, wherein the association information further comprises second association information that is generated when the on-demand SI request is voluntarily triggered by a remote UE, and the obtaining, by the relay UE, the association information related to the on-demand SI request comprises receiving the second association information from the remote UE, wherein the second association information comprises one or more of:

association information that is generated when the on-demand SI request is triggered by the remote UE in a connected state on its own initiative and the on-demand SI request is requested successfully;

association information that is generated when the on-demand SI request is triggered by the remote UE in the connected state on its own initiative and the on-demand SI request is requested unsuccessfully;

association information that is generated when the remote UE in the connected state plans to request for, but has not yet requested for, the on-demand SI;

association information that is generated when the remote UE in a non-connected state transmits a request to the relay UE unsuccessfully;

association information that is generated when the remote UE in the non-connected state transmits a request to the relay UE successfully; or association information that is generated when the remote UE in the non-connected state plans to request for, but has not yet requested for, the on-demand SI.

6. The information processing method according to claim 1, wherein the obtaining, by the relay UE, the association information related to the on-demand SI request comprises:

obtaining first configuration information from the network device, the first configuration information being used to indicate whether the relay UE is to obtain the association information related to the on-demand SI request triggered by a remote UE;

in the case that the first configuration information indicates that the relay UE is to obtain the association information related to the on-demand SI request triggered by the remote UE, receiving second association information from the remote UE, the second association information being association information that is generated when the on-demand SI request is triggered by the remote UE on its own initiative; or, determining the on-demand SI request triggered passively upon the receipt of an SI request message from the remote UE, and obtaining one or more of the fourth sub-association information, the fifth sub-association information or the sixth sub-association information that is generated when the on-demand SI request is triggered passively, or, wherein the obtaining, by the relay UE, the association information related to the on-demand SI request comprises:

obtaining, in accordance with a designated UE state in first configuration information from the network device, the association information related to the on-demand SI request and generated in the designated UE state, wherein the designated UE state comprises one or more of a connected state, an idle state or an inactive state.

7. An information processing method performed by a remote User Equipment (UE), the information processing method comprising:

obtaining, by the remote UE, second association information that is generated when an on-demand System Information (SI) request is triggered by the remote UE on its own initiative; and transmitting, by the remote UE, the second association information to a network device or a relay UE, wherein the second association information comprises one or more of:

association information that is generated when the on-demand SI request is triggered by the remote UE in a connected state on its own initiative and on-demand SI is requested successfully;

association information that is generated when the on-demand SI request is triggered by the remote UE in the connected state on its own initiative and the on-demand SI is requested unsuccessfully;

association information that is generated when the remote UE in the connected state plans to request for, but has not yet requested for, the on-demand SI;

association information that is generated when the remote UE in a non-connected state transmits a request to the relay UE unsuccessfully;

association information that is generated when the remote UE in the non-connected state transmits a request to the relay UE successfully; or association information that is generated when the remote UE in the non-connected state plans to request for, but has not yet requested for, the on-demand SI.

8. The information processing method according to claim 7, wherein subsequent to obtaining the second association information that is generated when the on-demand SI request is triggered by the remote UE on its own initiative, the information processing method further comprises, in the case that the remote UE is in a connected state, transmitting a second notification message to the network device, and the second notification message is used to notify the network device that the second association information is stored in the remote UE.

9. The information processing method according to claim 7, wherein the transmitting, by the remote UE, the second association information to the network device comprises:

receiving a second association information obtaining request from the network device, the second association information obtaining request being used to request association information stored in the remote UE; and transmitting the association information satisfying the second association information obtaining request to the network device in accordance with the second association information obtaining request.

10. The information processing method according to claim 7, wherein the obtaining, by the remote UE, the second association information that is generated when the on-demand SI request is triggered by the remote UE on its own initiative comprises receiving second configuration information from the network device, and the second configuration information is used to indicate whether the remote UE obtains the second association information that is generated when the on-demand SI request is triggered by the remote UE on its own initiative, or, wherein the obtaining, by the remote UE, the association information related to the on-demand SI request comprises obtaining, in accordance with a designated UE state in the second configuration information from the network device, the association information related to the on-demand SI request and generated in the designated UE state, wherein the designated UE state comprises one or more of a connected state, an idle state or an inactive state.

11. A remote User Equipment (UE), comprising a memory, a transceiver and a processor, wherein the memory is configured to store therein a program instruction, the transceiver is configured to receive and transmit data under the control of the processor, the processor is configured to read the program instruction in the memory so as to realize steps of the information processing method according to claim 7.

12. A relay User Equipment (UE), comprising a memory, a transceiver and a processor, wherein the memory is configured to store therein a computer instruction, and the transceiver is configured to receive and transmit data under the control of the processor, wherein the processor is configured to read the program instruction in the memory, so as to:

obtain association information related to an on-demand System Information (SI) request, the association information comprising first association information that is generated when the on-demand SI request is triggered by a relay User Equipment (UE); and transmit the association information to a network device, wherein the first association information comprises one or more of:

first sub-association information that is generated when the on-demand SI request is voluntarily triggered by the relay UE and on-demand SI is requested successfully;

second sub-association information that is generated when the on-demand SI request is voluntarily triggered by the relay UE and the on-demand SI is requested unsuccessfully;

third sub-association information that is generated when the relay UE plans to request for, but has not yet requested for, the on-demand SI;

fourth sub-association information that is generated when the on-demand SI request is passively triggered by the relay UE and the on-demand SI is requested successfully;

fifth sub-association information that is generated when the on-demand SI request is passively triggered by the relay UE and the on-demand SI is requested unsuccessfully; or sixth sub-association information that is generated when the on-demand SI request is passively triggered by the relay UE and the on-demand SI has not yet been requested, wherein the on-demand SI request triggered by the relay UE passively comprises an on-demand SI request triggered passively upon the receipt of an SI request message from a remote UE.

13. The relay UE according to claim 12, wherein the association information comprises one or more of:

a type of requested SI;

the quantity of requests;

a type of a UE requesting for the SI, the type of the UE comprising at least one of a relay UE or a remote UE;

a quantity of UEs requesting for the SI; or

Identities (IDs) of UEs requesting for the SI.

14. The relay UE according to claim 12, wherein subsequent to obtaining the association information related to the on-demand SI request, the processor is specifically configured to, in the case that the relay UE is in a connected state, transmit a first notification message to the network device, and the first notification message is used to notify the network device that the association information is stored in the relay UE.

15. The relay UE according to claim 12, wherein the transceiver is specifically configured to:

receive a first association information obtaining request from the network device, the first association information obtaining request being used to request for the association information stored in the relay UE; and transmit the association information satisfying the first association information obtaining request to the network device in accordance with the first association information obtaining request.

16. The relay UE according to claim 12, wherein the association information further comprises second association information that is generated when the on-demand SI request is voluntarily triggered by a remote UE, and when obtaining the association information related to the on-demand SI request, the processor is further configured to receive the second association information from the remote UE, wherein the second association information comprises one or more of:

association information that is generated when the on-demand SI request is triggered by the remote UE in a connected state on its own initiative and the on-demand SI request is requested successfully;

association information that is generated when the on-demand SI request is triggered by the remote UE in the connected state on its own initiative and the on-demand SI request is requested unsuccessfully;

association information that is generated when the remote UE in the connected state plans to request for, but has not yet requested for, the on-demand SI;

association information that is generated when the remote UE in a non-connected state transmits a request to the relay UE unsuccessfully;

association information that is generated when the remote UE in the non-connected state transmits a request to the relay UE successfully; or association information that is generated when the remote UE in the non-connected state plans to request for, but has not yet requested for, the on-demand SI.

17. The relay UE according to claim 12, wherein when obtaining the association information related to the on-demand SI request, the processor is specifically configured to:

obtain first configuration information from the network device, the first configuration information being used to indicate whether the relay UE is to obtain the association information related to the on-demand SI request triggered by a remote UE;

in the case that the first configuration information indicates that the relay UE is to obtain the association information related to the on-demand SI request triggered by the remote UE, receive second association information from the remote UE, the second association information being association information that is generated when the on-demand SI request is triggered by the remote UE on its own initiative; or, determine the on-demand SI request triggered passively upon the receipt of an SI request message from the remote UE, and obtain one or more of the fourth sub-association information, the fifth sub-association information or the sixth sub-association information that is generated when the on-demand SI request is triggered passively, or, wherein the processor is specifically configured to obtain, in accordance with a designated UE state in first configuration information from the network device, the association information related to the on-demand SI request and generated in the designated UE state, wherein the designated UE state comprises one or more of a connected state, an idle state or an inactive state.

* * * * *